United States Patent
Ukai et al.

(10) Patent No.: US 6,912,650 B2
(45) Date of Patent: Jun. 28, 2005

(54) PRE-PREFETCHING TARGET OF FOLLOWING BRANCH INSTRUCTION BASED ON PAST HISTORY

(75) Inventors: Masaki Ukai, Kawasaki (JP); Aiichiro Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 556 days.

(21) Appl. No.: 09/793,559

(22) Filed: Feb. 27, 2001

(65) Prior Publication Data

US 2001/0027515 A1 Oct. 4, 2001

Related U.S. Application Data

(63) Continuation-in-part of application No. 09/532,831, filed on Mar. 21, 2000.

(30) Foreign Application Priority Data

Sep. 29, 2000 (JP) ........................................ 2000-298837

(51) Int. Cl.[7] .................................................. G06F 9/38
(52) U.S. Cl. ........................ 712/237; 712/207; 712/238; 712/240
(58) Field of Search ................................ 712/207, 237, 712/238, 240, 239; 711/158

(56) References Cited

U.S. PATENT DOCUMENTS

| | | | |
|---|---|---|---|
| 4,980,823 A | | 12/1990 | Liu .............................. 712/207 |
| 5,226,138 A | | 7/1993 | Shermis ........................... 711/3 |
| 5,423,048 A | | 6/1995 | Jager ............................ 711/136 |
| 5,434,985 A | * | 7/1995 | Emma et al. ................. 712/240 |
| 5,461,722 A | * | 10/1995 | Goto ............................ 712/235 |
| 5,696,958 A | * | 12/1997 | Mowry et al. ............... 712/235 |
| 5,794,027 A | * | 8/1998 | Grohoski et al. ............ 712/238 |
| 6,058,461 A | * | 5/2000 | Lewchuk et al. ............ 711/158 |
| 6,195,735 B1 | * | 2/2001 | Krueger et al. .............. 711/204 |
| 6,212,603 B1 | * | 4/2001 | McInerney et al. .......... 711/125 |
| 2001/0054137 A1 | * | 12/2001 | Eickemeyer et al. ........... 712/11 |

FOREIGN PATENT DOCUMENTS

| | | |
|---|---|---|
| JP | 54-75964 | 6/1979 |
| JP | 64-8458 | 1/1989 |
| JP | 64-88658 | 4/1989 |
| JP | 5-241952 | 9/1993 |
| JP | 6-187150 | 7/1994 |

* cited by examiner

Primary Examiner—Kenneth S. Kim
(74) Attorney, Agent, or Firm—Staas & Halsey LLP

(57) ABSTRACT

An instruction control apparatus, and method, used with a device including a cache memory, a lower memory, an instruction fetch device issuing an instruction fetch request for a target of a first branch instruction to the cache memory, and an instruction control device processing a instruction sequence stored in the cache memory. The apparatus and method pre-prefetch a target instruction sequence for a target of a second branch instruction. A predetermined instruction sequence based on a past history is preliminarily transferred from the lower memory to the cache memory when the target instruction sequence for the target of the first branch instruction is not in the cache memory.

19 Claims, 41 Drawing Sheets

(a) DR   R0,R2    (OPERATION (DIVISION) INSTRUCTION)

(b) BCR  1,R3     (CONDITIONAL BRANCH INSTRUCTION)

(c) BCR  15,R4    (UNCONDITIONAL BRANCH INSTRUCTION)

(d) NOP           (BRANCH TARGET INSTRUCTION)

F I G.   1    PRIOR ART

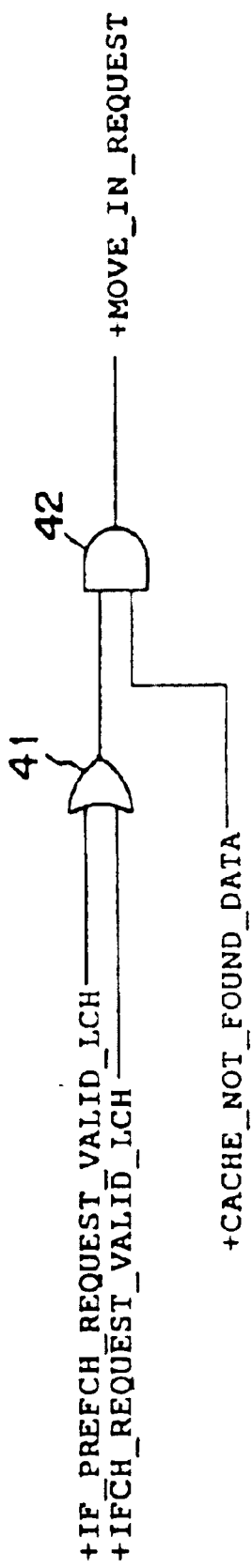
F I G. 11

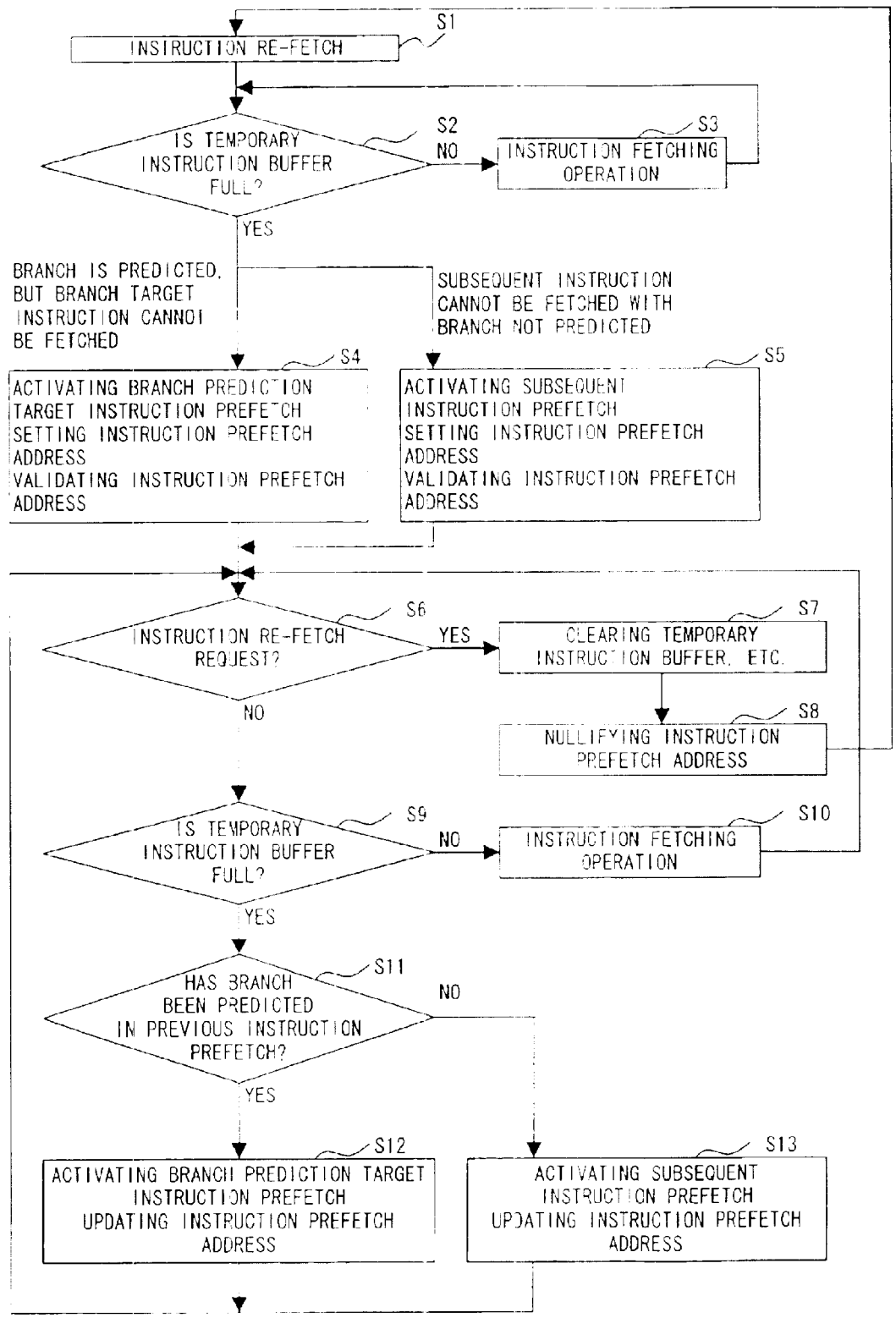
F I G. 29

PRE-PREFETCHING TARGET OF FOLLOWING BRANCH INSTRUCTION BASED ON PAST HISTORY

CROSS REFERENCE

This application is a continuation-in-part of application Ser. No. 09/532,831 filed Mar. 21, 2000, now pending.

BACKGROUND OF THE INVENTION

1. Field of the Invention

The present invention relates to an information processing apparatus operated in a pipeline process system (including a superscalar process system or an out-of-order process system), and more specifically to a prefetching process for quickly processing an instruction by shortening an apparent fetching time.

2. Description of the Related Art

In an information processing apparatus in which the pipeline process system is adopted, a subsequent instruction sequence is fetched and input to an instruction pipeline before the completion of a preceding instruction. In addition, since the operation of a main storage device is slow, a cache mechanism is adopted to quickly fetch the subsequent instruction sequence.

FIG. 1 shows an example of an instruction sequence containing a plurality of branch instructions.

In FIG. 1, the DR in the line (a) is a division instruction, the BCR in the line (b) is a conditional branch instruction, the BCR in the line (c) is an unconditional branch instruction, and the line (d) indicates a branch target instruction.

FIG. 2 shows the delay of the machine cycle according to the conventional technology.

First, an instruction in the line (a) is executed. When the instruction in the line (a) is executed at the A stage, the subsequent instruction in the line (b) is executed. Thus, in a speculative execution system such as the pipeline system, etc., a subsequent instruction is fetched and executed without awaiting the completion of a preceding instruction. However, since the instruction in the line (b) is a conditional branch instruction, it awaits the confirmation of the condition before the U stage after the A stage. During the wait, an instruction in the line (c) is executed. It is also a branch instruction (unconditional branch instruction), and is subject to the branch result of the line (b). Therefore, the execution at the U stage is in the wait state until it is determined that no branching occurs on the instruction in the line (b). When it is determined that no branching occurs on the instruction in the line (b), it is also determined that the unconditional branch instruction in the line (c) is executed. Therefore, the unconditional branch instruction in the line (c) is executed at the U stage. Upon the execution, an instruction to fetch the branch target instruction (NOP) in the line (d) is issued, and the branch target instruction is fetched and executed.

As clearly shown in FIG. 1, since fetching the branch target instruction in the line (d) is delayed, the instructions in the lines (a) through (c) are steadily executed in the pipeline process, but the instruction in the (d) line enters the wait state, thereby causing the delay in the pipeline process.

In the conventional technology, there is the first problem that the defect of the cache mechanism is very large, that is, a large penalty (delay time) is imposed when an instruction sequence issuing a fetch request does not hit in the cache. In this case, if the instruction fetch request is issued after confirming that the instruction fetch request is actually required, then the penalty is directly reflected in the performance difference in the case of an unsuccessful hit in the cache.

However, there is the second problem that, when the execution result of a preceding instruction affects the execution of a subsequent instruction, a correct subsequent instruction fetch request cannot be issued to execute the instruction until it is determined that the execution result of the preceding instruction never affects the execution of the subsequent instruction.

Although the branch target address of a first branch instruction is computed in the conventional technology, the branch target instruction of the first branch instruction is not fetched until the process of a second branch instruction to be processed before the first branch instruction is determined, and the execution of the first branch instruction is determined. That is, since an instruction sequence to be executed when it is determined that no branching occurs on the first branch instruction is fetched only after determining the branch condition of the second branch instruction written immediately before the first branch instruction is determined (after it is determined that the branch prediction is successfully made), there arises a loss in the execution of instructions because the start of the instruction fetch enters the wait state.

SUMMARY OF THE INVENTION

The present invention aims at providing an apparatus and a method of reducing the delay time in processing instructions in the information processing apparatus in which the pipeline process system, etc. is adopted.

The apparatus according to the first aspect of the present invention is an instruction fetch control device which controls the instruction fetch in an instruction control device including a cache memory unit, a lower memory unit, and an execution unit speculatively executing an instruction sequence stored in the cache memory unit. The apparatus includes an instruction fetch unit for issuing an instruction fetch request to the cache memory unit, and an instruction prefetch unit for prefetching an instruction by preliminarily transferring a predetermined instruction sequence from the lower memory unit to the cache memory unit when an instruction sequence which is to issue a fetch request is not contained in the cache memory unit.

The apparatus according to the second aspect of the present invention is an instruction fetch control device which controls the instruction fetch in an instruction control device including a cache memory unit, a lower memory unit, and an execution unit speculatively executing an instruction sequence stored in the cache memory unit. The apparatus includes an instruction fetch unit for issuing an instruction fetch request to the cache memory unit, an address generation unit for obtaining a branch target instruction address if branching occurs when a conditional branch instruction or an unconditional branch instruction is executed, and a branch target instruction prefetch unit for prefetching a branch target instruction for requesting the cache memory unit to fetch the branch target instruction if the branch target instruction address is requested when branching occurs for the branch instruction.

The method according to the present invention used with a device including cache memory, lower memory, an instruction fetch device for issuing an instruction fetch request to cache memory, and an instruction control device for processing a instruction sequence stored in the cache memory prefetches an instruction to be preliminarily transferring a predetermined instruction sequence from the lower memory to the cache memory when an instruction sequence which is to issue a fetch request is not contained in the cache memory.

According to the present invention, it is not necessary to newly transfer a necessary instruction sequence for a fetching operation from lower memory in the case of an unsuccessful hit in the cache by prefetching an instruction sequence to be fetched, thereby suppressing the time delay in the execution of instructions.

In addition, when a branch instruction appears, a branch prediction is made to fetch a predicted branch target instruction. According to the conventional technology, when the branch prediction fails, the instruction sequence has to be refetched when it is discriminated that the branch prediction has failed. As a result, a process delay occurs. However, according to the present invention, a sequence of branch target instructions not specified in a branch prediction is prefetched and stored in a temporary instruction buffer. Therefore, although a branch prediction fails, a necessary instruction sequence can be immediately fetched from the cache memory, thereby suppressing a process delay.

According to another aspect of the present invention, if a previously executed instruction is to rewrite the contents of the address at which an instruction is to be prefetched, the instruction prefetch is canceled. Therefore, when the contents of the address is rewritten by an instruction such as a store instruction, the instruction prefetch can be performed with consistency.

BRIEF DESCRIPTION OF THE DRAWINGS

FIG. 1 shows an example of a instruction sequence containing a plurality of branching operations;

FIG. 11 shows an example of the configuration of the circuit for generating a data request signal to lower memory;

FIG. 29 is a flowchart of the basic flow of the process according to the present embodiment.

DESCRIPTION OF THE PREFERRED EMBODIMENTS

Figure 2:
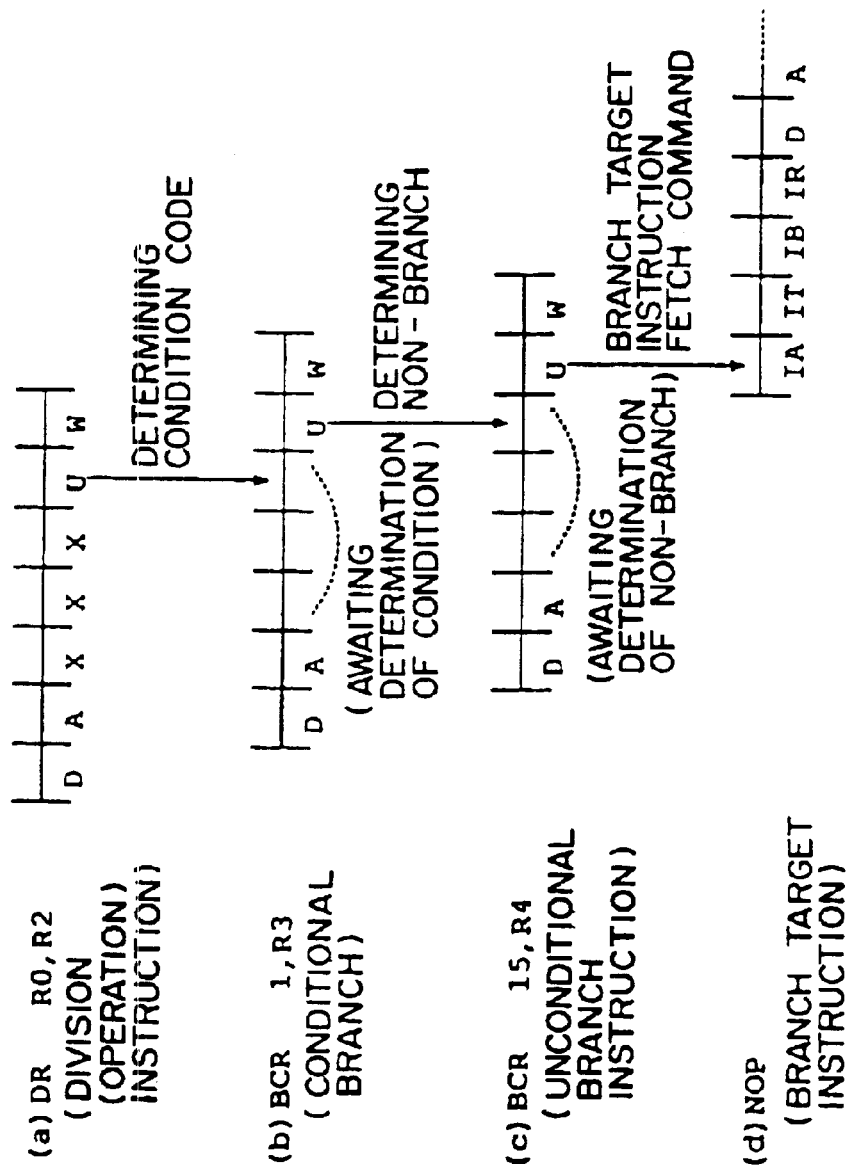
FIG. 2 shows the delay of a machine cycle when the conventional method is adopted.

Described below is the embodiment of the present invention.

As a method for solving the first problem, an instruction prefetch mechanism is used to preliminarily transmit the range of addresses at which an instruction is probably executed to the cache mechanism, and to start preliminarily entering an instruction sequence from the main storage device or lower cache memory (if the cache memory comprises a plurality of stages) before fetching an actual instruction if an instruction sequence at the address is not entered in the cache mechanism.

Thus, the unsuccessful hit rate can be reduced, thereby improving the performance. Although the entering operation of the cache cannot be performed before an instruction is actually fetched, the delay time (penalty for unsuccessful hit) can be shorter than in the conventional technology by the time difference between the actual instruction fetch and the prefetch request according to the embodiment of the present invention.

With a device not capable of issuing a plurality of fetch instruction prefetch requests at the same timing, the priorities of instruction prefetch requests are set, and requests are issued according to the set priority.

With the above described configuration, it is wasteful to issue a plurality of prefetch requests at the same address. Therefore, flags are set to suppress the plurality of prefetch requests at the same address. In addition, in some formats of cache mechanisms, a data unit larger than the byte length to be fetched is to be managed as a unit (cache block). In this case, an instruction prefetch request to the same cache block is suppressed. That is, although the addresses at which instructions are to be prefetched are different, it is wasteful to prefetch an instruction again to read it from the main storage to the cache memory if an instruction at the same address is contained in the cache block stored in the cache memory in the previous prefetching operation. Therefore, in this case, a prefetch request is suppressed.

A method for solving the second problem adopts a branch instruction prefetch mechanism in which, specifically, an instruction fetch request is issued to the instruction fetch control unit, but it is not yet determined whether or not the instruction fetch result is transmitted to the instruction decoder, or it is possible to temporarily suspend an instruction fetching operation.

When a branch instruction functions, the branch target address can be determined before the determination of a condition code, that is, before it is determined whether or not branching occurs.

For example, when an operation instruction and the subsequent conditional branch instruction flow in the pipeline system, the branch target instruction address of the subsequent branch instruction is obtained at the A stage before the condition code is determined (U stage of the operation instruction) and it is determined whether or not branching occurs as a result of the execution (X stage) of the operation instruction.

However, as shown in FIG. 1, when an instruction sequence contains (a) an operation instruction, (b) a conditional branch instruction, and (c) an unconditional branch instruction, the branch target instruction of (c) the unconditional branch instruction cannot fetched until it is determined that (c) the unconditional branch instruction is executed, that is, until it is determined that branch does not occur for (b) the conditional branch instruction according to the conventional technology.

Figure 3:
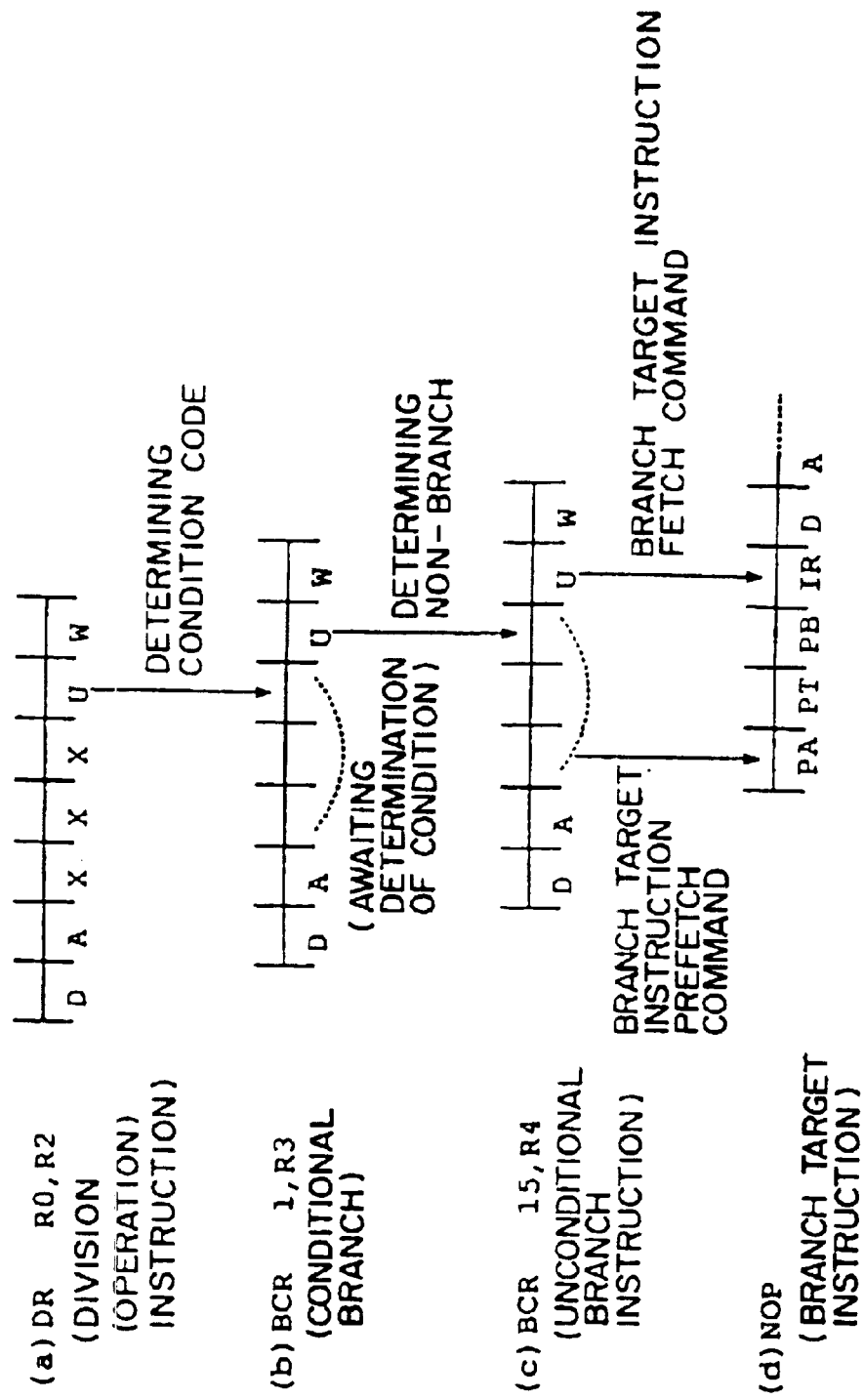
FIG. 3 shows the execution of a instruction sequence when the present invention is applied.

However, according to embodiment of the present invention, as shown in FIG. 3, when the branch target address of the unconditional branch instruction in the line (c) is determined, an instruction can be prefetched (branch instruction prefetch) at the address. Then, the condition code is determined by executing the operation instruction in the line (a). If branching does not occur for the conditional branch instruction in the line (b), the unconditional branch instruction in the line (c) is executed. Therefore, all decoded, executed, or fetched instruction sequences subsequent to the unconditional branch instruction are canceled, and an already started branch instruction prefetching operation is continued as the actual instruction prefetch. In the case shown in FIG. 3, the performance can be improved by 3 clocks as compared with the conventional technology. At this time, if another branch instruction prefetching operation is being performed, it is also unnecessary and canceled. On the other hand, if the branching of the conditional branch instruction in the line (b) is determined, and it is determined that the unconditional branch instruction in the line (c) is not executed, then the already started branch instruction prefetching operation is stopped and canceled.

Although the unconditional branch instruction in the line (c) is a conditional branch instruction, the embodiment of the present invention can be applied. It is obvious that the embodiment of the present invention can be applied to the conditional branch instruction in the line (b) of the above described instruction sequence. In addition, a person of ordinary skill in the art can easily understand that the embodiment of the present invention can be applied to any instruction sequence between two branch instructions. Furthermore, although a branch prediction mechanism such as a branch history is provided, the identical method can be applied by prefetching a subsequent branch instruction (instruction sequence in case branching does not occur) when branching is predicted for a conditional branch instruction. That is, when a branch prediction is made, not a predicted branch target address, but the address of the next instruction to be processed when branching does not occur can also be prefetched by a branch instruction prefetching operation.

In addition, for example, when branching never occurs for a branch instruction used instead of a NOP (no operation) instruction, no branch occurs to the address referred to as a branch target address. Therefore, it is wasteful to prefetch the branch instruction. As a result, if the prefetching process is suppressed, a wasteful operation can be avoided, thereby successfully preventing the performance from being lowered. Similarly, as with an unconditional branch instruction, it is wasteful to prefetch an instruction subsequent to a branch instruction all instructions subsequent to which are never executed. Therefore, a wasteful operation can be avoided by suppressing the prefetch, thereby successfully preventing the performance from being lowered.

As described above by referring to the method for solving the first problem, in an apparatus in which a plurality of fetch branch instruction prefetch requests cannot be issued at the same timing, the priorities are set between instructions to be prefetched so that the requests can be issued according to the set priorities.

Since the branch instructions are not always prefetched, it is necessary to confirm the possibility of the execution. A temporary instruction buffer is provided for temporarily storing an instruction sequence prefetched for a branch instruction at the previous stage before a decoding process. In addition, instead of providing a temporary instruction buffer, an instruction prefetching operation can be interlocked during the operation. In any case, the interlock is released on a predetermined condition, and the fetching operation can be continued, or the processes in and after the decoding process can be performed.

Especially, when the present invention is applied to a super-scalar process system, a plurality of branch instructions are processed within a short time. Therefore, according to the method of the embodiment of the present invention, a consecutive prefetching operation or a plural branch instruction prefetching operation can also be performed. Furthermore, a plurality of branch instruction prefetch requests can be satisfied by providing a temporary instruction buffer corresponding to the plurality of branch instruction prefetching operations.

In this case, a method of discriminating each branch instruction prefetch is used.

When the main storage contains a cache memory mechanism, the performance can be furthermore improved by providing a device to a branch instruction prefetch request depending on the feature of the cache memory mechanism.

When the performance of the cache memory is inferior in capacity, an instruction sequence normally used frequently by the branch instruction prefetch can be possibly removed from the cache memory. Especially, since the branch performance is not high, the possibility is strong. To avoid the possibility, the instruction sequence is retrieved from the main storage to suppress the update of the cache memory if there is not the prefetch instruction in the cache, thereby preventing the deterioration in performance.

On the other hand, although the performance of a cache mechanism is excellent, it may be hard to provide a control circuit. In this case, an instruction sequence can be preliminarily read from the main storage when the cache cannot be successfully hit by making the most of the excellent performance of the cache function. As a result, when the instruction sequences are actually required, the penalty for the unsuccessful hit in the cache can be minimized. That is, the above described first problem can be solved.

There are some instruction sequences containing instructions to write data to the memory (hereinafter referred to as store instructions. There is constantly the possibility that a store instruction can rewrite a branch instruction prefetch data sequence. Therefore, it is necessary in the branch instruction prefetching process to comprise a unit for detecting the possibility, and to reflect the result of the store instruction rewriting a branch instruction prefetch data sequence in the instruction sequence.

In addition to the method for rewriting an actually branch instruction prefetched instruction sequence, the branch instruction prefetching process can be canceled if the store instruction actually rewrites the instruction sequence, or can rewrite it. An instruction sequence obtained by a branch instruction prefetch request is not always executed actually. Therefore, in the above described method, the configuration of the circuit can be preferably simple.

The configuration of each circuit is described below in detail by referring to the attached drawings. The numbers enclosed by < and > shown in the attached drawings indicate bit numbers. A smaller number indicates a higher order bit, and a larger number indicates a lower order bit. Therefore, <1> is the MSB, and <31> is the LSB.

Figure 4:
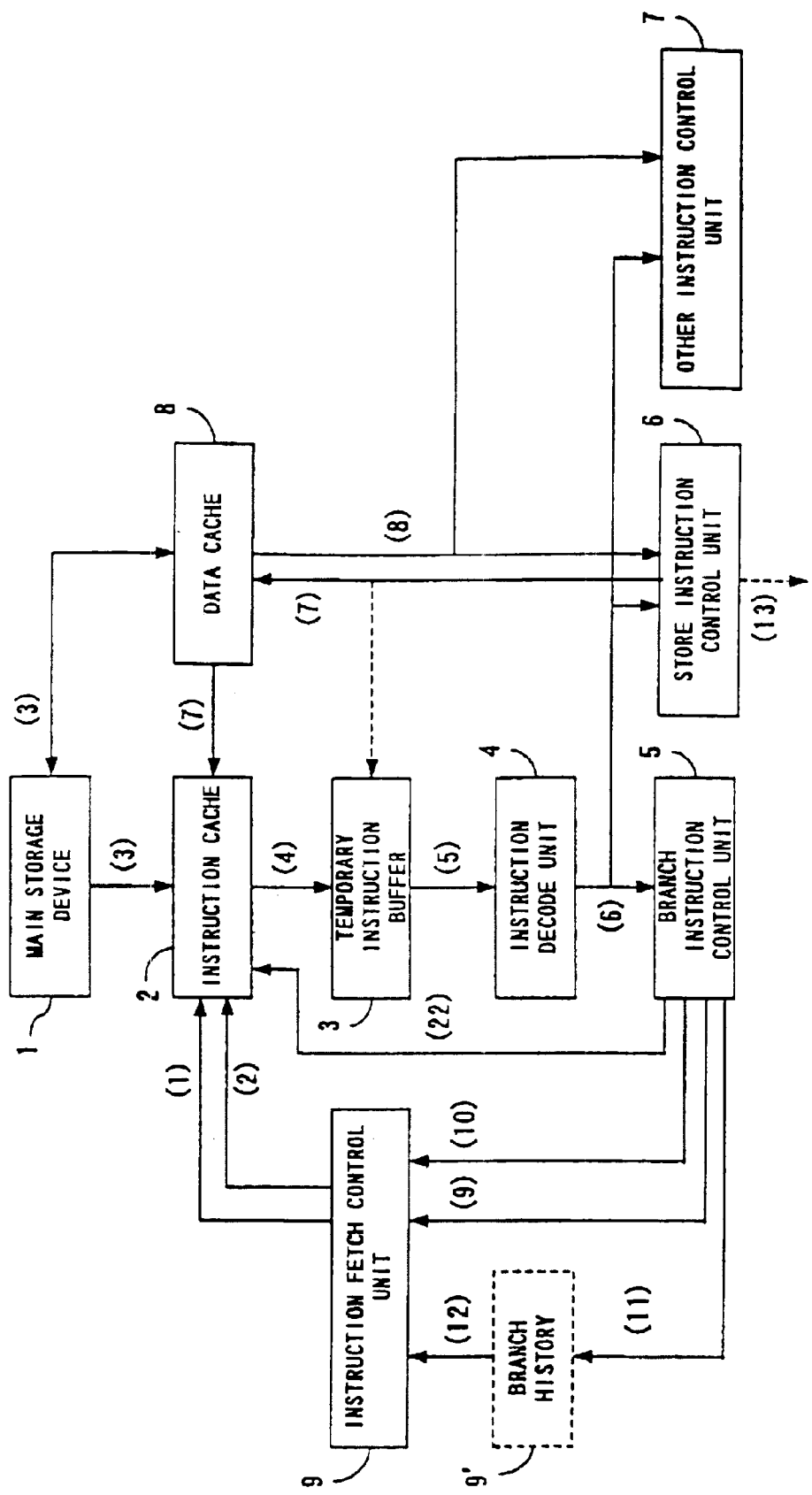
FIG. 4 shows the general configuration of the entire apparatus according to the present invention.

FIG. 4 shows the general configuration (important portion) of the entire apparatus according to the present embodiment.

According to the present embodiment, there are two instruction fetch ports A and B one of which is a port in which an instruction is currently executed, and the other holds a branch target instruction predicted as a branch by the branch prediction mechanism (branch history). The functions of these ports can be dynamically changed.

The correspondences among the signals shown in and after FIG. 4 are listed below.
(1) instruction fetch request (+IFCH_REQUEST_VALID)
(2) instruction prefetch request (+IF_PREFCH_REQUEST_VALID)
(3) data
(4) fetch instruction sequence
(5) instruction sequence to be decoded
(6) information obtained after decoding instruction
(7) stored data
(8) operand data
(9) instruction refetch request (+RE_IFETCH_REQUEST)
(10) branch instruction prefetch request (+BR_PREFCH_REQ_VALID)
(11) branch history information
(12) branch prediction information
(13) fetch instruction sequence overwrite possibility detection signal by store instruction
(14) move-in (copying data from main storage device to cache) request (+MOVE_IN_REQUEST)
(15) instruction fetch address
(16) signal indicating a non-fetch state (+SU_BUSY)
(17) signal indicating non-instruction-prefetch state ((+SU_PREFCH_BUSY)
(18) instruction refetch address
(19) branch prediction target address
(20) branch prediction signal (+BRHIS_HIT)
(21) branch instruction prefetch address
(22) branch prediction failure signal (CANCEL_ALL_PORT)

In FIG. 4, the instruction data (3) is fetched and transmitted from a main storage device 1 to an instruction cache 2. Then, the fetch instruction sequence (4) is stored in a temporary instruction buffer 3, and the instruction sequence (5) to be decoded is input to an instruction decode unit 4. Then, based on the decode result of the instruction decode unit 4, each piece of decode information is input to each control unit (a branch instruction control unit 5, a store instruction control unit 6, and an other instruction control unit 7). At this time, operand data is input together with the instruction data to a data cache 8, and then input to the store instruction control unit 6 and the other instruction control unit 7 together with the decoded instruction for use in the process in each of the control units (8). When process result data is stored, the store instruction control unit 6 writes the stored data (7) to the data cache 8, and transmits the data obtained by rewriting an instruction sequence to from the data cache 8 to the instruction cache 2. If the instruction sequence is stored in the temporary instruction buffer 3, the stored data (7) is transmitted to the temporary instruction buffer 3. When an instruction sequence and an operand to be rewritten are stored in the main storage device 1, the stored data (3) is transmitted to the main storage device 1.

In addition, an instruction fetch control unit 9 outputs the instruction fetch request (1) to the instruction cache 2, fetches an instruction sequence into the temporary instruction buffer 3, issues the instruction prefetch request (2), and prefetches an instruction from the main storage device 1 to the instruction cache 2.

If the branch instruction control unit 5 requires to fetch a new instruction as a result of processing a branch instruction, it issues the instruction refetch request (9) to the instruction fetch control unit 9, and outputs to the instruction fetch control unit 9 the branch instruction prefetch request (10) to prefetch an instruction at the address of the branch not specified by a branch prediction. Furthermore, the branch instruction process result of the branch instruction control unit 5 is transmitted to a branch history 9' as the branch history information (11) for use in generating the branch prediction information (12) in the branch history 9'. The branch prediction information (12) is transmitted to the instruction fetch control unit 9, and is used in fetching an instruction at the branch target address of a branch instruction. Furthermore, when the branch instruction control unit 5 determines that a branch prediction has failed, it transmits the branch prediction failure signal (22) to the instruction cache 2, and cancels the port storing the branch target instruction fetched by the instruction cache 2.

Figure 5:
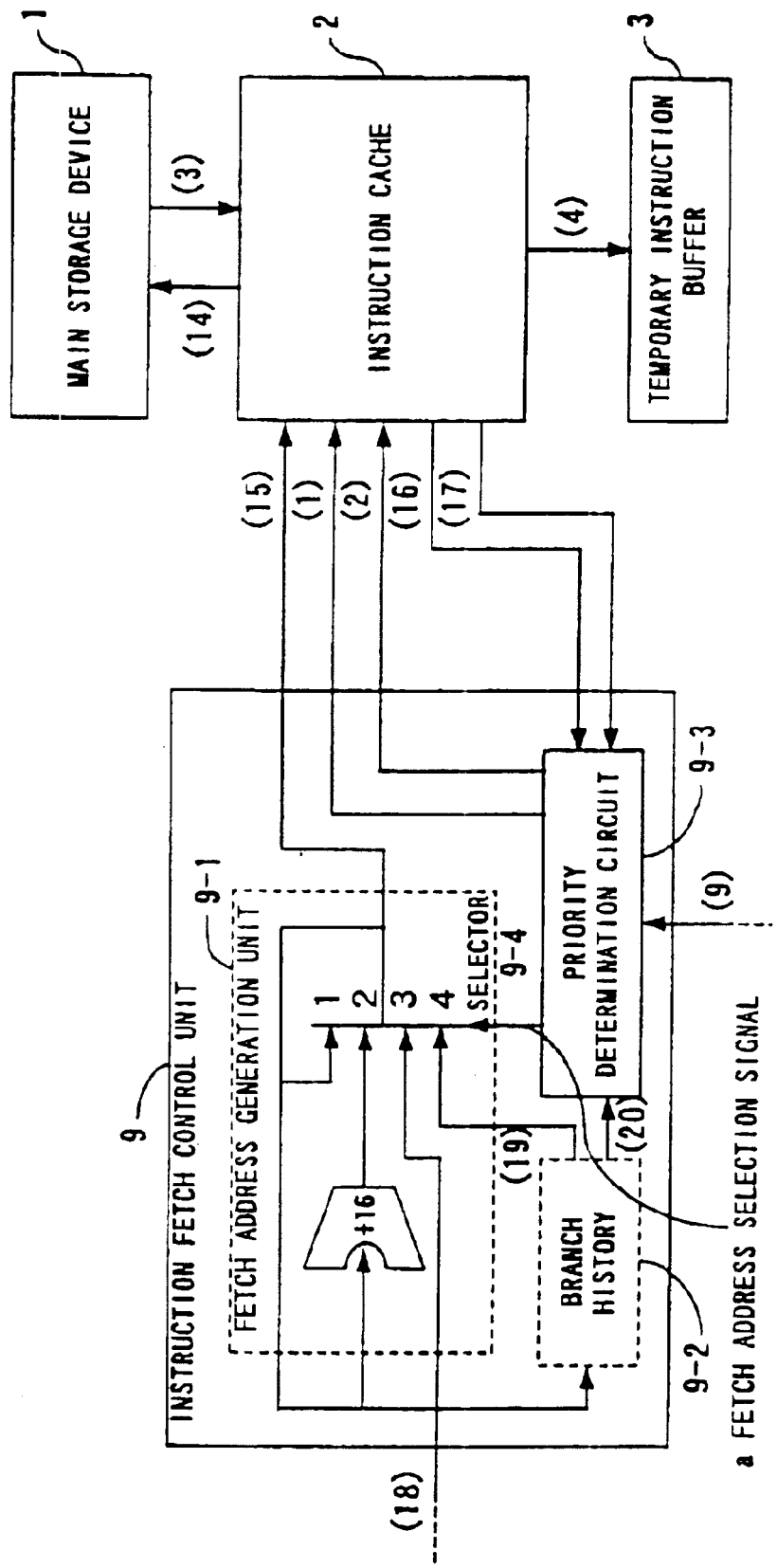
FIG. 5 shows an example of the configuration of an instruction prefetch mechanism.

FIG. 5 shows an example of the configuration of the instruction prefetch mechanism.

According to the present embodiment, one instruction fetch request can be issued in one clock. The instruction fetch request can be a request for sequential fetch (subsequent instruction fetch), branch target fetch (branch prediction target instruction fetch), instruction refetch (fetch as a result of a branch prediction failure, an occurrence of an interruption, etc.), branch target instruction prefetch, and sequential instruction prefetch.

Assuming that the priorities of these five requests indicate the order of the instruction refetch request, the branch target fetch request, the branch target instruction prefetch request, the sequential fetch request, and the sequential instruction prefetch, a priority determination circuit 9-3 issues a request to the instruction cache 2 based on the priorities.

A fetch address generation unit 9-1 generates an address of an instruction to be fetched, and inputs it to a selector 9-4. The signal 1 is set to output an address when a fetch request is issued, but cannot be accepted because of an interruption, etc. The signal 2 is computed and output from a 16-byte adder, and indicates an address used in the sequential fetch. The signal 3 indicates the instruction refetch address (18) input corresponding to the instruction refetch request (9). In addition, the signal 4 indicates the branch prediction target address (19) obtained as a result of the process performed by the branch history 9-2. When the priority determination circuit 9-3 receives a branch prediction signal 20 from a branch history 9-2, it outputs a fetch address selection signal a based on the priorities of the instruction fetch and the instruction prefetch, makes the selector 9-4 select the branch prediction target address (19) and input it to the instruction cache 2 as the instruction fetch address (15). At this time, the priority determination circuit 9-3 inputs the instruction fetch request (1) to the instruction cache when an instruction at the address of the instruction fetch address (15) is to be fetched, and inputs the instruction prefetch request (2) to the instruction cache 2 when an instruction is to be prefetched.

When the instruction cache 2 accepts the instruction fetch request (1), the instruction (4) is transmitted from the instruction cache 2 to the temporary instruction buffer 3. At this time, When there is not an instruction to be fetched in the instruction cache 2, the instruction data (3) is read from the main storage device 1, and the instruction (4) is fetched to the temporary instruction buffer 3.

When the instruction cache 2 accepts the instruction prefetch request (2), the instruction cache input the move-in request (14) to the main storage device 1, and prefetches an instruction from the address input according to the signal (15) of the main storage device 1.

When the instruction cache 2 cannot fetch an instruction, the signal (16) is input to the priority determination circuit 9-3. When an instruction cannot be prefetched, the signal (17) is input to the priority determination circuit 9-3. Thus, the instruction fetch control unit 9 retries the instruction fetch and the instruction prefetch.

Figure 6:
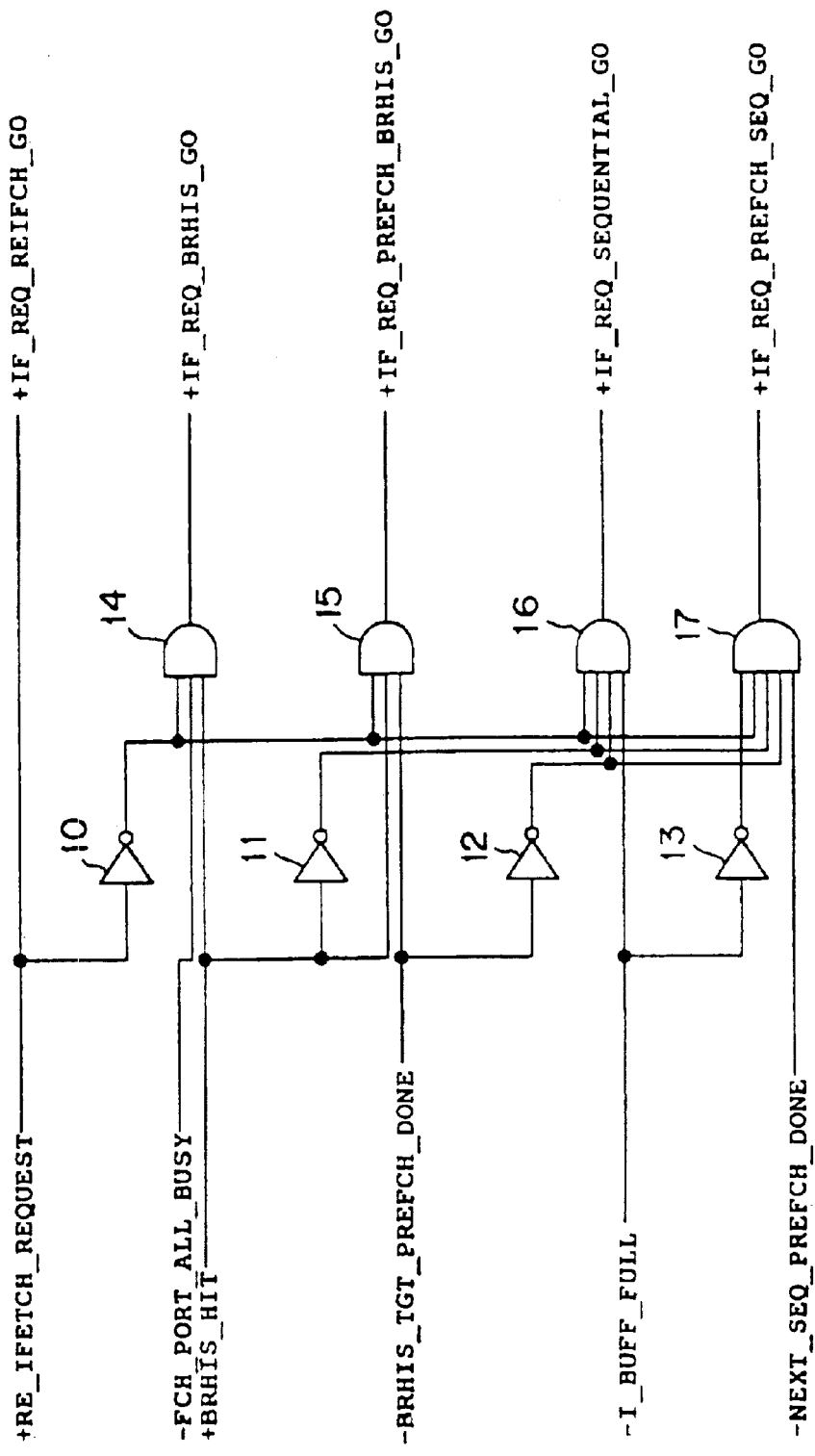
FIG. 6 shows an example of the configuration of the priority determination circuit shown in FIG. 5.

FIG. 6 shows an example of the configuration of the priority determination circuit shown in FIG. 5.

That is, according to the present embodiment, an instruction refetch permission signal (+IF_REQ_REIFCH_GO) is output as instruction refetch as is when an instruction refetch request (+RE_IFETCH_REQUEST) is input, thereby performing the instruction refetch by highest priority. When there is not an instruction refetch request, a branch target fetch signal (+IF_REQ_BRHIS_GO) is processed only when a branch is predicted, and (+BRHIS_HIT) is H, and the fetch port to store a target fetch instruction is empty, that is, (−FCH_PORT_ALL_BUSY) is H. That is, a signal obtained by inverting the logic of the instruction refetch request (+RE_IFETCH_REQUEST) by an inverter 10, a signal (−FCH_PORT_ALL_BUSY), which is a signal from the instruction cache 2, obtained by inverting the logic of a signal indicating that all fetch ports are occupied, and a branch prediction signal (+BRHIS_HIT) are input to an AND circuit 14. The result of the AND of the signals is output from the AND circuit 14 as a branch target fetch permission signal (+IF_REQ_BRHIS_GO).

Otherwise, the priority of an branch target instruction prefetch permission signal (+IF_REQ_PREFCH_BRHIS_GO) is set as a higher order than a fetch signal (+IF_REQ_SEQUENTIAL_GO) (sequential fetch) of a subsequent instruction. It is obvious that a branch target instruction prefetching process is not performed if an instruction refetching process is not performed, and a branch prediction is not successfully made. Therefore, a logic product of a logic inverted signal of the (+RE_IFETCH_REQUEST), the +BRHIS_HIT signal, and a signal (−BRHIS_TGT_PREFECH_DONE) indicating that the branch target instruction prefetch has not been performed is obtained by an AND circuit 15 to generate +IF_REQ_PREFCH_BRHIS_GO.

Figure 8:
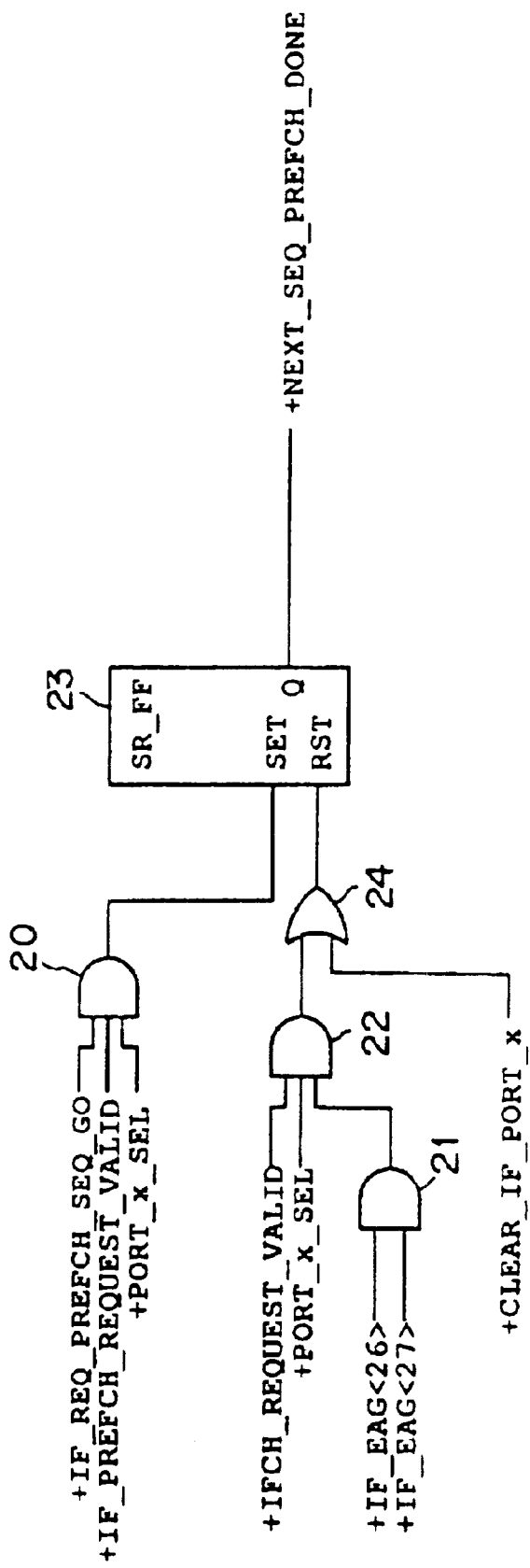
FIG. 8 shows an example of a circuit for generating a flag for suppression of repetitive prefetch requests for instructions contained in the same cache block.

In the circuit shown in FIG. 6, +IF_REQ_BRHIS_GO and +IF_REQ_PREFCH_BRHIS_GO are simultaneously output, but, when an address is selected, the same address is used, and a request signal to the cache mechanism is prioritized for actual fetch as shown in the circuit shown in FIG. 8, thereby suppressing a problem.

The sequential fetch permission signal (+IF_REQ_SEQUENTIAL_GO) is obtained by an AND circuit 16 as a logic product of a logic inverted signal of the +RE_IFETCH_REQUEST obtained by the inverter 10, the logic of the +BRHIS_HIT inverted by an inverter 11, the −BRHIS_TGT_PREFECH_DONE inverted by an inverter 12, and a −I_BUFF_FULL signal. This indicates that a sequential fetch request is output to the instruction cache 2 when an instruction refetch request is not issued, a branch prediction signal is not output, the branch target instruction prefetch is performed, and the instruction buffer of an instruction cache is not full (−I_BUFF_FULL is H) Furthermore, a sequential instruction prefetch permission signal (+IF_REQ_PREFECH_SEQ_GO) is output from an AND circuit 17 when the identical sequential fetch conditions are set for the instruction refetch, the branch prediction signal, and the branch target instruction prefetch, when the instruction cache instruction buffer is full, and when the subsequent sequential instruction prefetch is not performed (−NEXT_SEQ_PREFCH_DONE is H).

Thus, the sequential (subsequent) instruction prefetch (+IF_REQ_PREFECH_SEQ_GO) is set as the lowest order. It is obvious that other priorities can be commonly set. Each GO signal (a signal output to the right in FIG. 4) is used as a fetch address selection signal a shown in FIG. 3.

Since it is not meaningful to continuously issue requests for the same address or the same page in the cache, a wasteful prefetch request can be suppressed by avoiding the above described continuous requests, thereby allowing a fetch request to be issued to a lower cache or the main storage device 1.

Figure 7:
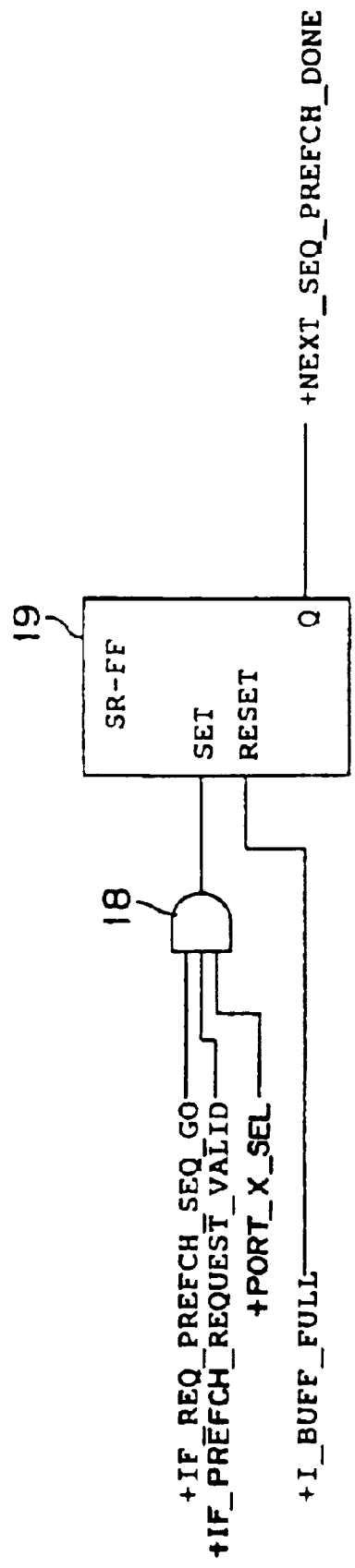
FIG. 7 shows an example of the configuration of the flag generation circuit (in case of sequential prefetch) for suppressing consecutive issues of prefetch requests to the instructions at the same address.

FIG. 7 shows an example of the configuration of the flag generation circuit (in case of sequential prefetch) to suppress continuous prefetch requests for instructions at the same address.

A flag is set for each fetch port (instruction fetch port), and is independently set ON and OFF.

The sequential instruction prefetch permission signal (+IF_REQ_PREFECH_SEQ_GO) output from the priority determination circuit 9-3, the instruction prefetch request (+IF_PREFCH_REQUEST_VALID), and the fetch port selection signal (+PORT_x_SEL, where x indicates the identifier or the number of a port, and is used to set a flag when the fetch port selection signal belonging to the circuit shown in FIG. 7 is input) are input to an AND circuit 18. When all values are H, a logic H signal is input to the SET terminal of an SR-FF (flipflop) 19. In addition, the signal (+I_BUFF_FULL) indicating that the instruction buffer of the instruction cache 2 is full is also input to the RESET terminal of the SR-FF 19. When the logic H signal is input to the SET terminal, the next sequential instruction is prefetched, and a signal (flag; +NEXT_SEQ_PREFCH_DONE) indicating that a prefetch request for the same address should not be issued is output as H (as ON) from the output terminal Q. On the other hand, when the +I_BUFF_FULL signal is input as the logic H to the RESET terminal, it indicates that the buffer of the instruction cache 2 is full, thereby indicating that an instruction at the same address has already been fetched. As a result, the next instruction prefetch request is not to be issued for the same address the output flag of the +NEXT_SEQ_PREFCH_DONE signal is L (OFF). With the configuration, requests are not issued for the same address of the instruction cache 2.

FIG. 8 shows an example of the circuit for generating a flag for suppression of a prefetch request by repeating the instruction contained in the same cache block.

As shown in FIG. 7, the circuit shown in FIG. 8 is also provided for each fetch port.

When the +IF_REQ_PREFECH_SEQ_GO signal is input from the priority determination circuit 9-3, the instruction prefetch request (+IF_PREFCH_REQUEST_VALID) and the fetch port selection signal (+PORT_x_SEL) are ANDed and input to the SET terminal of the flipflop, and the prefetch suppression signal (+NEXT_SEQ_PREFCH_DONE) is output. In addition, when an instruction fetch request (+IFCH_REQUEST_VALID) signal is input, an AND circuit 21 determines whether or not the final bit signal (+IF_EAG<26> and +IF_EAG<27>) of the cache block is "11" (in this example, a 64-byte cache block is assumed, and the last two bits are set to "11"), and the result is input to an AND circuit 22 together with an instruction fetch request. Furthermore, the port selection signal (+PORT_x_SEL) is input and ANDed in the AND circuit 22, and input to an OR circuit. A signal (+CLEAR_IF_PORT_x) for forcibly clearing a port is also input to the OR circuit. When an instruction fetch request reaches the last address of the cache block or when a port is forcibly cleared, the flipflop is reset, and the output of the flag is set as L (OFF).

Figure 9:
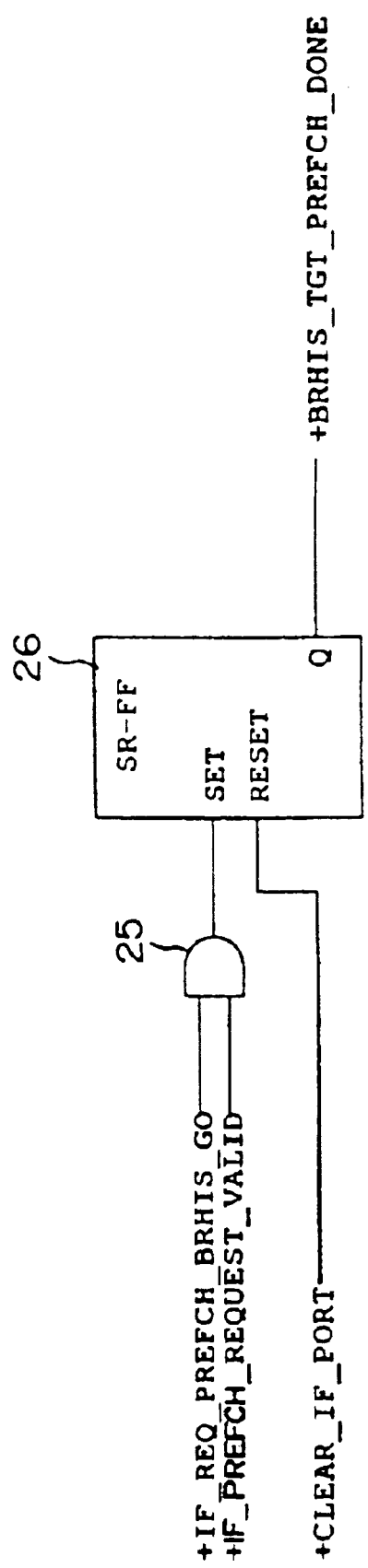
FIG. 9 shows an example of the configuration of the circuit of the same prefetch request suppression flag (in case of predicted branch target prefetch)

FIG. 9 shows an example of the configuration of the circuit of the same prefetch request suppression flag (in the case of a branch prediction target prefetch).

When the +IF_REQ_PREFCH_BRHIS_GO signal is input from the priority determination circuit 9-3, the signal and the instruction prefetch request signal (+IF_PREFCH_REQUEST_VALID) are ANDed in an AND circuit 25, and the result is input to the SET terminal of the flipflop. Thus, when the logic product is H, the flag (+BRHIS_TGT_PREFECH_DONE) for suppression of a branch prediction target prefetch request at the same address is output as ON. When a forcible port clear signal (+CLEAR_IF_PORT) is input to the RESET terminal, the output of the signal (+BRHIS_TGT_PREFECH_DONE) is suppressed.

When an instruction prefetch request is to be issued according to the priority determination circuit 9-3, the instruction prefetch request is different from other fetch requests in the instruction contents. Accordingly, the different contents should be discriminated from each other.

Figure 10:
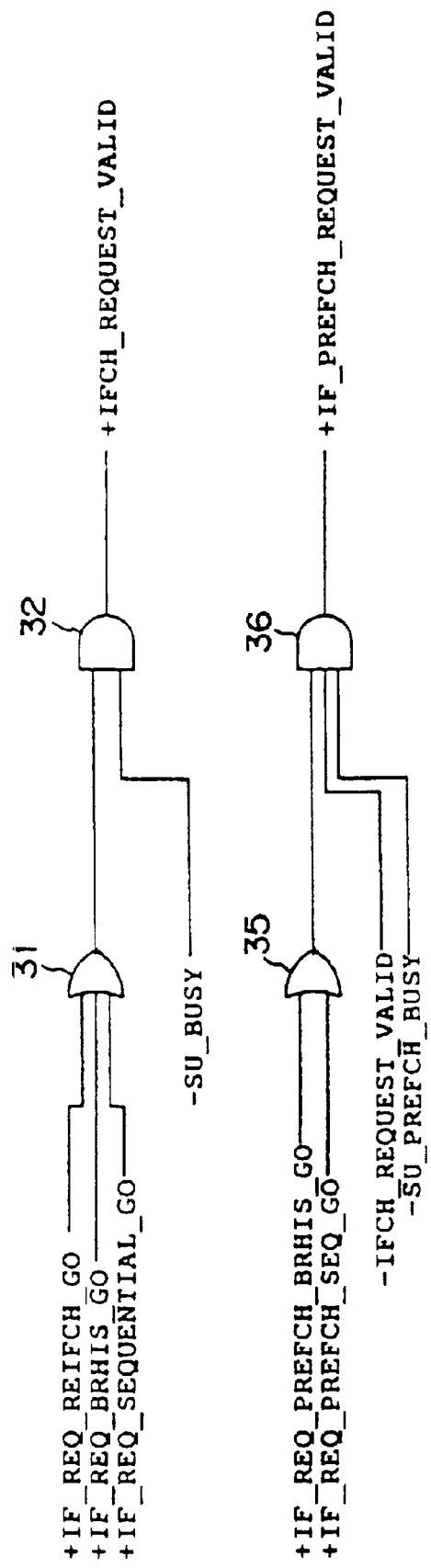
FIG. 10 shows an example of the configuration of the fetch/prefetch discrimination circuit.

FIG. 10 shows an example of the configuration of a fetch/prefetch discrimination circuit.

Since instruction fetch request outputs from the priority determination circuit are three signals +IF_REQ_REIFCH_GO, +IF_REQ_BRHIS_GO, and +IF_REQ_SEQUENTIAL_GO. Therefore, the OR of the signals is obtained, and the result and the signal (−SU_BUSY) indicating the state in which a fetching operation can be performed are ANDed, thereby generating the instruction fetch request (+IFCH_REQUEST_VALID).

In addition, an instruction prefetch request output from the priority determination circuit 9-3 can be two signals instruction prefetch permission signal +IF_REQ_PREFCH_BRHIS_GO and sequential instruction prefetch permission signal +IF_REQ_PREFCH_SEQ_GO. Therefore, the OR of these signals is obtained. The result, the signal (−IFCH_REQUEST_VALID) indicating that an instruction fetch request is not issued, and the signal (−SU_PREFCH_BUSY) indicating the state in which an instruction can be prefetched are ANDed, and the instruction prefetch request (+IF_PREFCH_REQUEST_VALID) is output.

In the cache mechanism, when there is an unsuccessful hit in the cache, data is normally transferred from a lower cache mechanism or the main storage device. Therefore, depending on the signal (as described above) identifying an instruction prefetch request, the process for a hit/mishit in a cache can be changed. That is, for an unsuccessful hit in the cache, data request can be issued to a lower cache or the main storage device as in the case of an unsuccessful hit in the cache in a normal instruction fetching operation.

FIG. 11 shows an example of the configuration of the circuit for generating a data request signal to lower memory.

When one of the signal (+IF_PREFCH_REQUEST_VALID) obtained by providing a latch for the instruction prefetch request signal and the signal (+IFCH_REQUEST_VALID_LCH) obtained by providing a latch for the instruction fetch request signal is input as H, an output of an OR circuit 47 is H. Then, the output and a signal (+CACHE_NOT_FOUND_DATA) indicating an unsuccessful hit in the cache obtained from the instruction cache 2 are ANDed. Thus, when there arises an unsuccessful hit in the cache, a data request (move-in: +MOVE_IN_REQUEST) to lower memory is output as H. The data request signal is input to the instruction cache 2.

In addition, when a data request is issued to lower memory such as a lower cache or the main storage device, no cache data is transmitted to an instruction control device in any case. Therefore, a suppression circuit is required. According to the present embodiment, a cancel signal of a fetch request is used.

Figure 12:
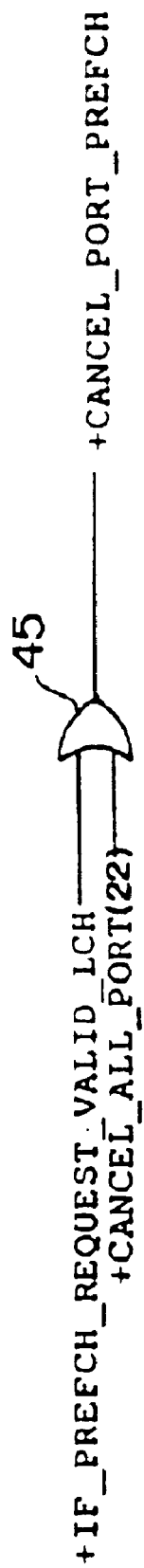
FIG. 12 shows an example of the configuration of the circuit for generating a data transfer suppression signal from the cache to the instruction control device when a prefetch request is issued.

FIG. 12 shows an example of a circuit for generating a signal for suppressing data transfer from the cache to the instruction control device when a prefetch request is issued.

When a signal (+IF_PREFCH_REQUEST_VALID_LCH) obtained by providing a latch to an instruction prefetch request, or a signal (+CANCEL_ALL_PORT) (22) indicating a branch prediction failure input from the branch instruction control unit is input, a +CANCEL_PORT_PREFCH which is a data transfer suppression signal for suppression of data transfer to the instruction suppression device is output.

Figure 13:
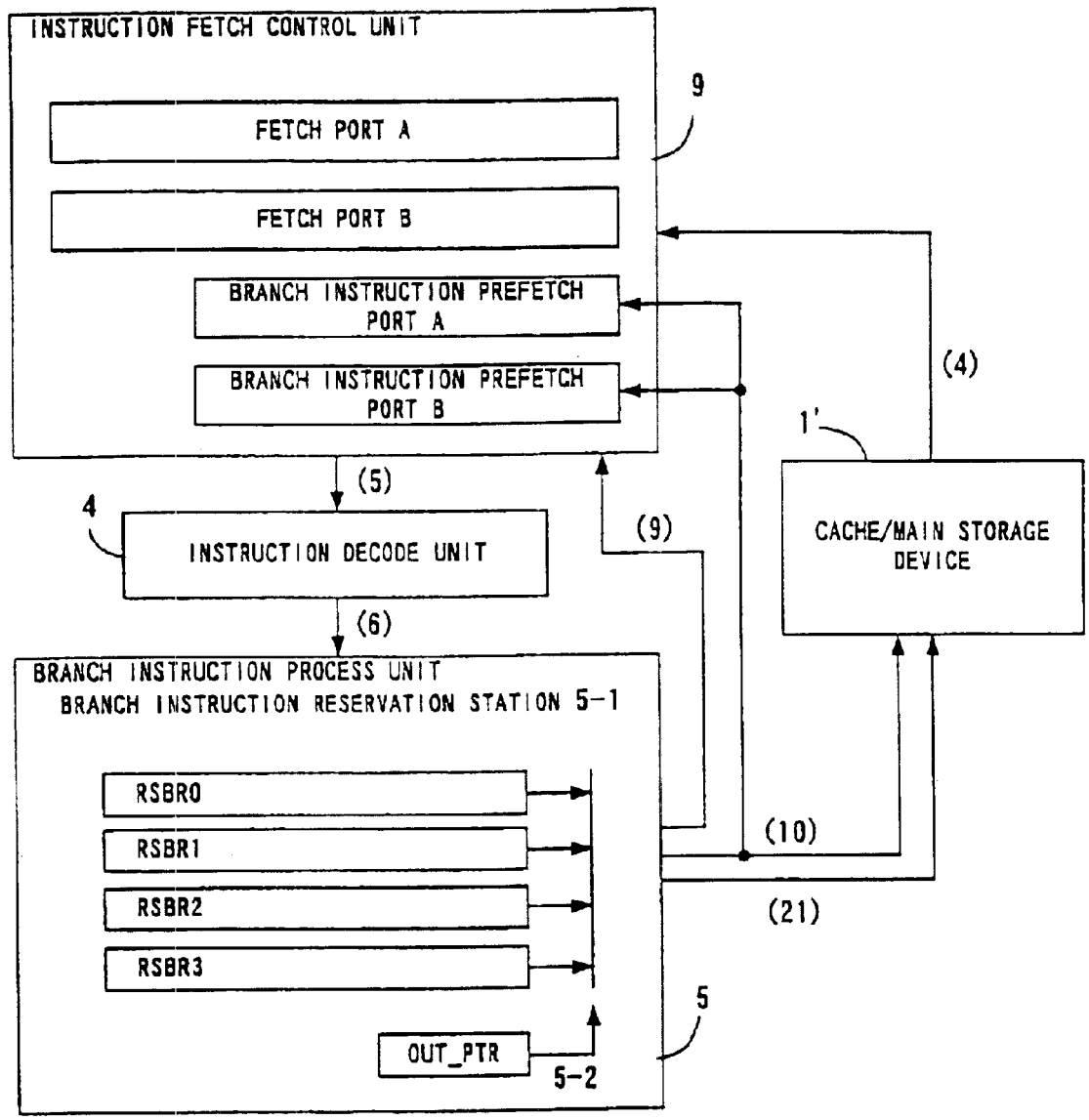
FIG. 13 shows an example of the second configuration of the instruction prefetch mechanism.

FIG. 13 shows an example of the configuration of the second instruction prefetch mechanism.

According to the present embodiment, the instruction fetch control unit 9 has two branch instruction prefetch ports. That is, it can issue a maximum of two branch instruction prefetch requests. In addition, it is assumed that one instruction fetching operation or one branch instruction prefetching operation can reserve a 16-byte instruction sequence from a main storage unit (or cache) 1'.

The branch instruction process unit 5 contains four branch instruction reservation stations 5-1, and can manage a maximum of four branch instructions.

In addition, in FIG. 13, each signal assigned a number enclosed by parentheses is described above by referring to FIG. 4.

The cache/main storage device 1' transmits a fetch instruction sequence (4) to the instruction fetch control unit 9, and the fetch instruction sequence is stored in the fetch port A or B. The fetched instruction sequence is transmitted to the instruction decode unit 4 as an instruction sequence (5) to be decoded, and is then decoded. The instruction decoded information (6) is input to the branch instruction process unit 5 when it is a branch instruction, and is then entered in a branch instruction reservation station 5-1. Then, a branch instruction prefetch request (10) is transmitted to the cache/main storage device 1' by referring to the reservation station 5-1 specified by the out-pointer (OUT-PTR) 5-2, and is then stored in the branch instruction prefetch port A or B of the instruction fetch control unit 9. The branch instruction prefetch address (21) is transmitted to a cache/main storage device ½. When an instruction fetching operation fails, the instruction refetch request (9) is transmitted from the branch instruction process unit 5 to the instruction fetch control unit 9.

Figures 14A, 14B:
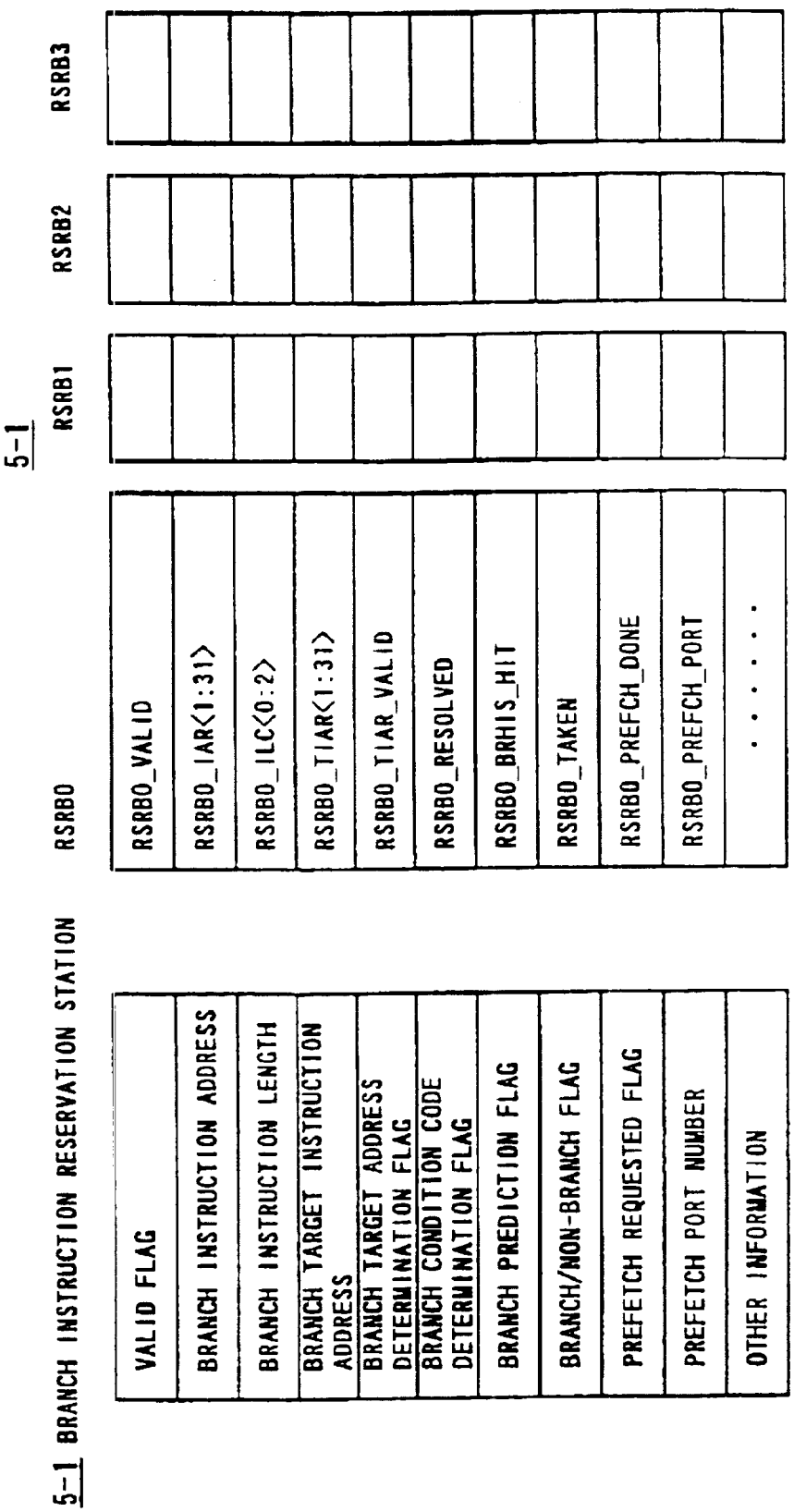
FIGS. 14A and 14B show examples of the contents of the entry of the branch instruction reservation station.

The branch instruction reservation station 5-1 has entries as shown in FIG. 14A. According to the present embodiment, a branch instruction can be completed for a maximum of one instruction, and the next branch instruction to be completed is managed by the pointer 5-2. The signal of each entry shown in FIGS. A and B is used in the circuit described later.

Figure 15:
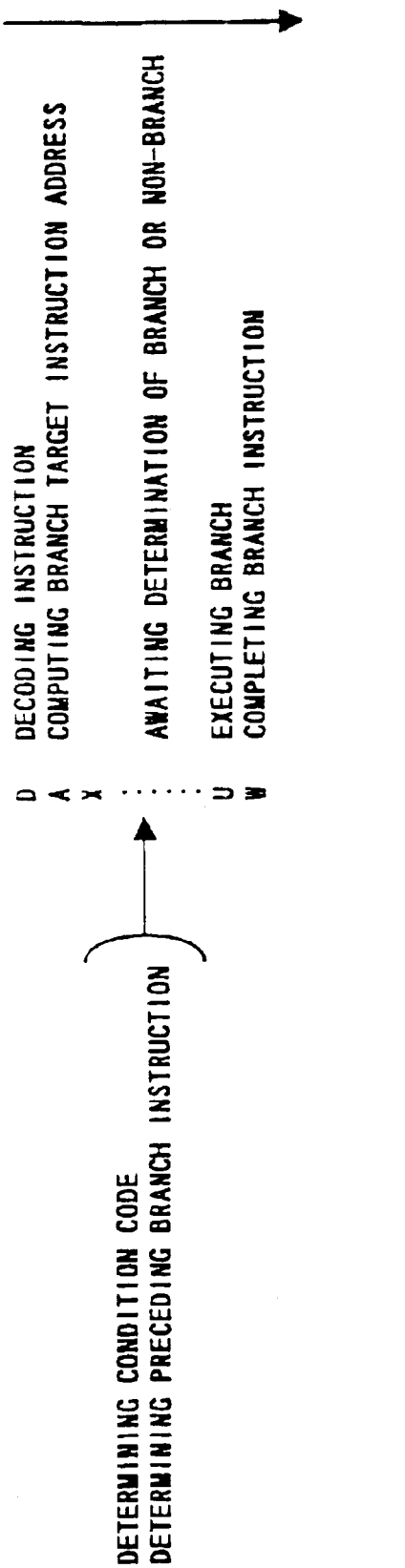
FIG. 15 shows the flow of the process of a branch instruction.

FIG. 15 shows the process flow of a branch instruction.

First, an instruction is decoded at the stage D, and a branch target instruction address is computed at the stage A. Then, the determination as to whether or not branching occurs is awaited at the stage X. At the stage X, a condition code and a previous branch instruction are determined. Then, a branch is executed at the stage U, and the branch instruction is completed at the stage W.

That is, an instruction decoded by the instruction decode unit 4 and defined as a branch instruction is entered in the branch instruction reservation station 5-1, and the branch target address to be used when branching occurs on the instruction is computed by the address generation unit (not shown in FIG. 15). Then, upon completion of the operations instruction executed immediately before the instruction, the condition code is determined, thereby determining the operation of the branch instruction. When the branch instruction can execute either an operation predicted by a branch prediction or an actual operation, an instruction is refetched only after the operation is determined (at the stage U) according to the conventional technology.

Figure 16:
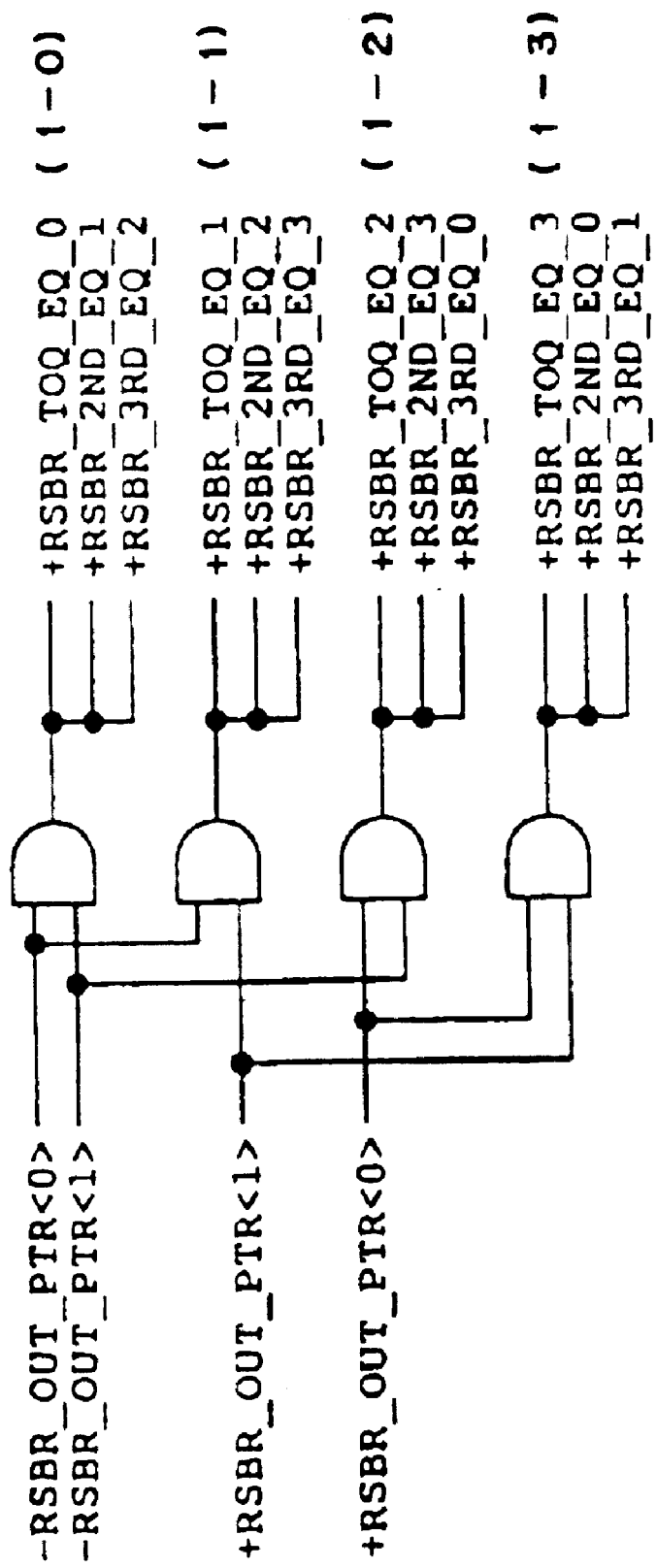
FIG. 16 shows an example of the configuration of the execution order circuit of the branch instruction reservation station.

FIG. 16 shows an example of the configuration of the execution order circuit of the branch instruction reservation station.

According to a signal (RSBR_OUT_PTR<0>, <1>) which is output from the out-pointer 5-2 shown in FIG. 13, and specifies a branch instruction reservation station containing a branch instruction to be processed, the priority of each branch instruction reservation station is determined. The signal output from the out-pointer 5-2 is represented by two bits. When it is "00", the highest priority is assigned to the 0-th reservation station RSBR0. When it is "10", the highest priority is assigned to the first reservation station RSBR1. When it is "01", the highest priority is assigned to the second reservation station RSBR2. When it is "11", the highest priority is assigned to the third reservation station RSBR3. The priority is cyclically assigned from the highest to the lowest.

Figure 17:
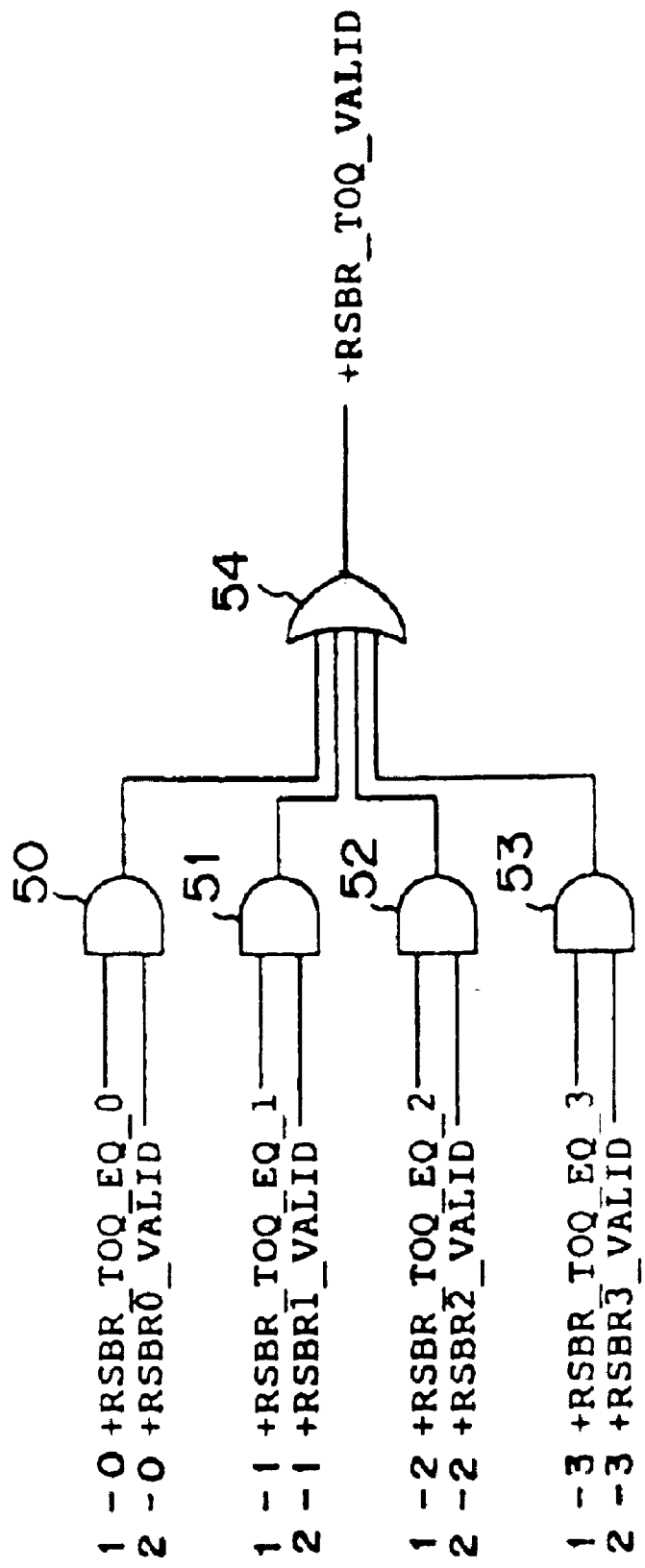
FIG. 17 shows an example of the execution order dependent signal generation circuit of the branch instruction reservation station.

FIG. 17 shows an example of the execution order signal generation circuit of the branch instruction reservation station.

The circuit shown in FIG. 17 indicates only one having the highest priority. However, a similar circuit can be provided for each priority order.

Each of the signals 1-0 through 1-3 input from the circuit shown in FIG. 16, and each of the valid flags 2-0 through 2-3 which are entries of the branch instruction reservation stations RSBR0 through 3 are input to the AND circuits 50 through 53 respectively. When both signals 1-0 to 1-3 and 2-0 to 2-3 become H, a signal (in the case shown in FIG. 17, +BSBR_TOQ_VALID) indicating that a branch instruction corresponding to the branch instruction reservation station of the priority should be processed is output through a OR circuit 54 to which the outputs of the AND circuits 50 through 53 are input.

Figure 18:
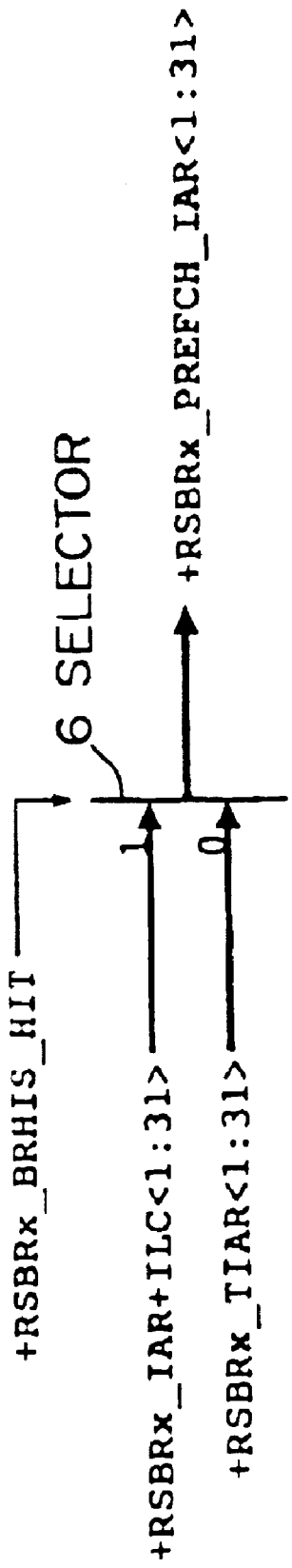
FIG. 18 shows an example of the configuration of the branch instruction prefetch address generation circuit.

FIG. 18 shows an example of the configuration of the circuit for generating a branch instruction prefetch address.

The circuit shown in FIG. 18 is also provided corresponding to each of the branch instruction reservation stations RSBR0 through RSBR3.

An address signal (+RSBRx_IAR+ILC<1:31>) obtained by adding the branch instruction address and the branch instruction length, which are entries of the branch instruction reservation station RSBRx (x=0 through 3), and a branch target instruction address (+RSBR_TIAR<1:31>) are input to a selector 61. They respectively indicate the address of the instruction sequence and the branch target instruction address described in the line subsequent to the branch instruction of each program. The selector 61 is controlled by a branch prediction flag (+RSBRx_BRHIS_HIT) which is an entry of the branch instruction reservation station RSBRx. One of the addresses is output as a branch instruction prefetch address (+RSBRx_PREFCH_IAR<1:31>). A branch prediction flag is "0" when a non-branch is predicted in the branch history 9-2. It is "1" when a branch is predicted. When the branch prediction flag is "0", the selector 61 selects and outputs a branch target instruction address. When the branch prediction flag is "1", it selects and outputs the signal obtained by adding the branch instruction length to the branch instruction address as a branch instruction prefetch address.

Figure 19:
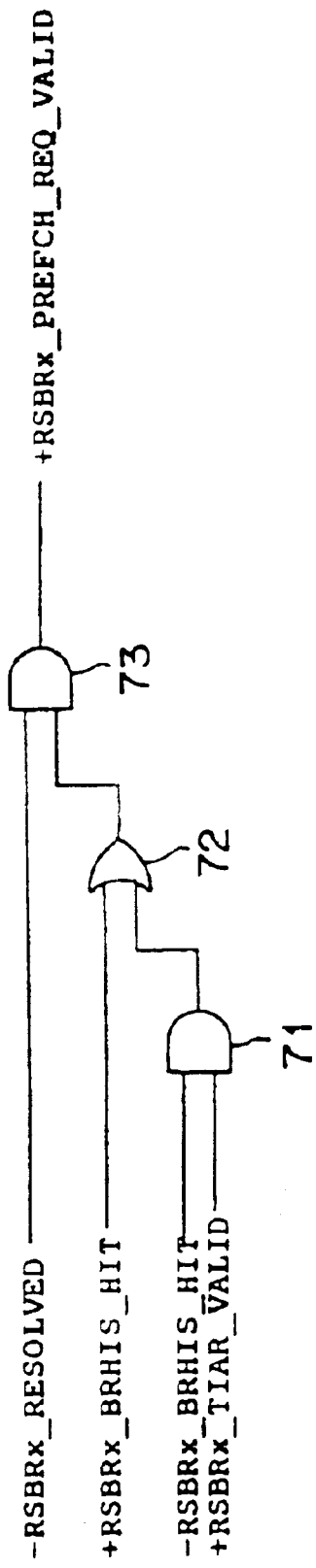
FIG. 19 shows an example of the configuration of the branch instruction prefetch enable signal generation circuit.

FIG. 19 shows an example of the configuration of the branch instruction prefetch enable signal generation circuit.

The circuit shown in FIG. 19 is provided for each of the branch instruction reservation station RSBRx.

In the circuit shown in FIG. 19, the branch target address determination flag (+RSBRx_TIAR_VALID) which is an entry of each of the branch instruction reservation stations RSBRx, and a signal (−RSBRx_BRHIS_HIT) obtained by logically inverting the branch prediction flag are ANDed. That is, when a branch target address is determined and a branch prediction is not made, the output of an AND circuit 71 is "1". This signal is input to an OR circuit 72 with the branch prediction flag (+RSBR_BRHIS_HIT), and then input to an AND circuit 73. Then, the signal and the branch condition code determination flag (−RSBRx_RESOLVED), which is an entry of the branch instruction reservation station RSBRx, are ANDed, and the branch instruction prefetch enable signal (+RSBRx_PREFCH_REQ_VALID) is output.

Figure 20:
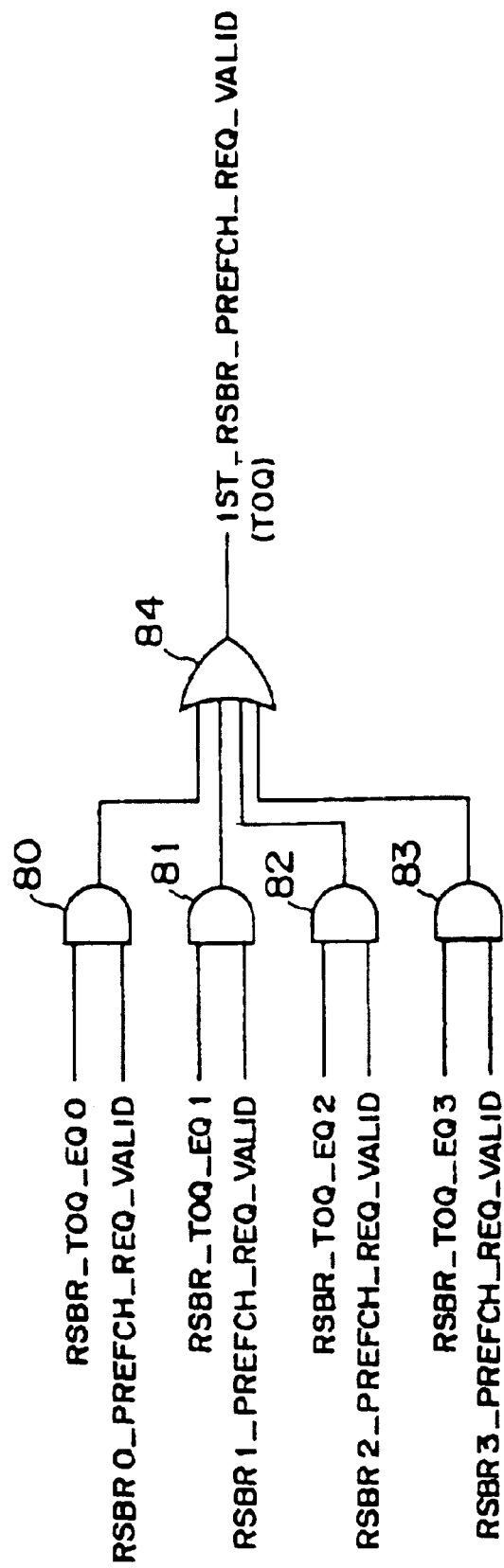
FIG. 20 shows an example of the configuration of the intermediate circuit for generating a signal to be input in the process shown in FIG. 21.
Figure 21:
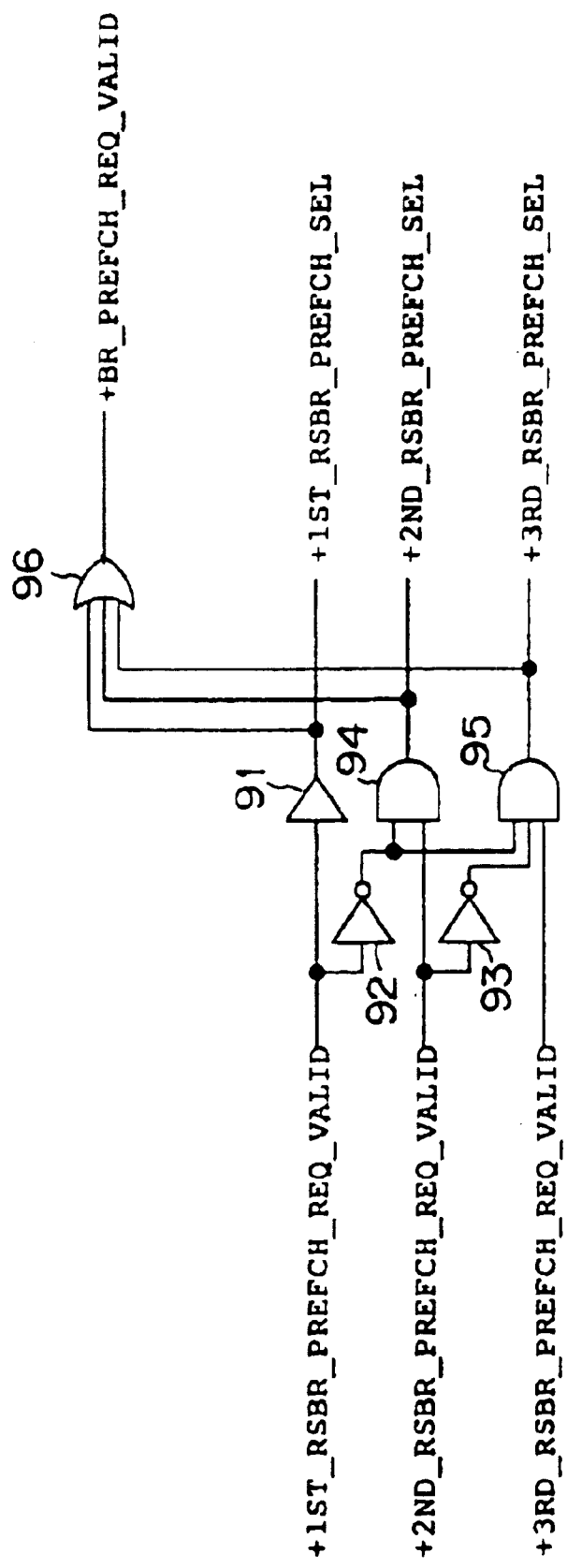
FIG. 21 shows an example of the configuration of the circuit for generating a branch instruction prefetch request valid signal and a selection signal.

FIG. 20 shows an example of the configuration of the intermediate circuit for generating a signal to be input in the process shown in FIG. 21.

The number of the circuits shown in FIG. 20 is equal to the number of priorities of the branch instruction reservation stations RSBR0 through RSBR3, that is, three circuits including the circuit shown in FIG. 20 are provided according to the present embodiment.

The output signals from the circuits shown in FIGS. 16 and 19 are input to AND circuits 80 through 83 respectively. If the execution order is assigned to each branch instruction reservation station, and the branch instruction prefetching operation can be performed, then an intermediate signal (1ST (TOQ)_RSBR_PREFCH_REQ_VALID, and the signals having the 2nd and 3rd priorities are also generated in parallel) for generating a signal issued to request to prefetch a branch instruction stored in the branch instruction reservation station RSBRx corresponding to the branch instruction prefetch is output.

FIG. 21 shows an example of the configuration of the circuit for generating a branch instruction prefetch request valid signal and a selection signal.

The circuit shown in FIG. 21 receives an output shown in FIG. 20, prefetches by priority the branch instruction reservation station RSBRx having the highest priority (1st), and then outputs the 2nd and the 3rd branch instruction prefetch selection signals (+1ST_RSBR_PREFCH_SEL, +2ND_RSBR_PREFCH_SEL, +3RD_RSBR_PREFCH_SEL). Using these selection signals, it can be determined which branch instruction reservation station RSBRx contains a branch instruction corresponding to the branch target instruction to be prefetched.

When any of the selection signals is output, it is assumed that a branch instruction prefetch request has been generated, and a branch instruction prefetch request (+BR_PREFCH_REQ_VALID) is output.

With the circuit configurations shown in FIGS. 18 through 21 according to the present embodiment, when a non-branch is predicted, the branch target instruction prefetching operation can be started immediately after the branch target address is computed. When a branch is predicted, the branch instruction subsequent to the non-branch instruction can be immediately prefetched when an instruction is entered in the branch reservation station. At this time, the flag (RSBRx_PREFCH_DONE) indicating that a branch instruction prefetching operation has been performed is set in the branch instruction reservation station RSBRx, and simultaneously a flag indicating that the selected branch instruction prefetch port is being used is also set in the branch instruction reservation station RSBRx.

Figure 22:
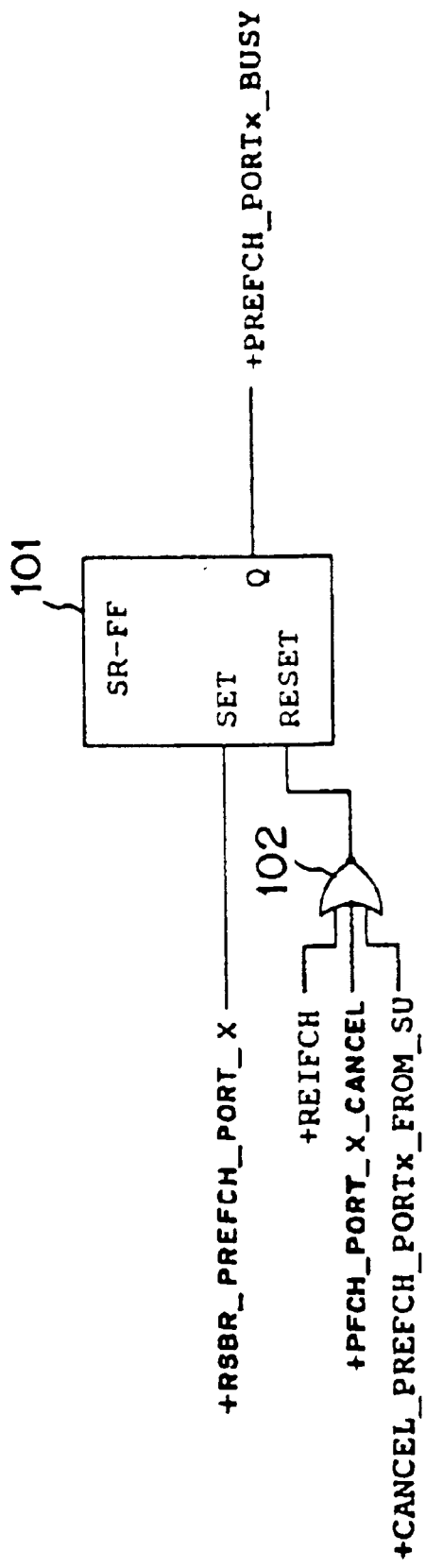
FIG. 22 shows an example of the configuration of the circuit for generating a flag indicating the 'in use' state of the branch instruction prefetch port.

FIG. 22 shows an example of the configuration of the circuit for generating a flag indicating an in-use state of a branch instruction prefetch port.

Since there are two branch instruction prefetch ports A and B as shown in FIG. 13, there are also two circuits for the ports A and B as shown in FIG. 22. If the number of the branch instruction prefetch ports is not two, an equal number of circuits should be provided.

The circuit shown in FIG. 22 receives +RSBR_PREFCH_PORT_x, which is an entry of the branch instruction reservation station, and outputs through a flipflop 101 a flag +PREFCH_PORTx_BUSY indicating that the port selected for the prefetch is being used. In addition, when any of the instruction refetch request (described +REIFCH in FIG. 22 as a +RE_IFETCH_REQUEST signal) which is the signal (9) shown in FIG. 13, the cancel signal +PFCH_PORT_x_CANCEL of the prefetch port shown in FIG. 25 explained later, or the signal +CANCEL_PREFCH_PORTx_FROM_SU indicating the cancellation of the prefetching operation input from the instruction cache is input to an OR circuit 102, the flipflop 101 is reset, and an in-use flag (+PREFCH_PORTx_BUSY) of the branch instruction prefetch port is reset.

When an RSBRx_PREFCH_DONE flag is set, the prefetch request is canceled according to the condition code, or switched into actual instruction fetch if a condition code is determined (that is, a RSBRx_RESOLVED flag is set in the branch instruction reservation station RSBRx), and the previous branch instruction is determined (that is, the current instruction is a branch instruction having the highest priority).

On the other hand, if the branch instruction prefetching operation is not required, the prefetch port can be canceled.

Figure 23:
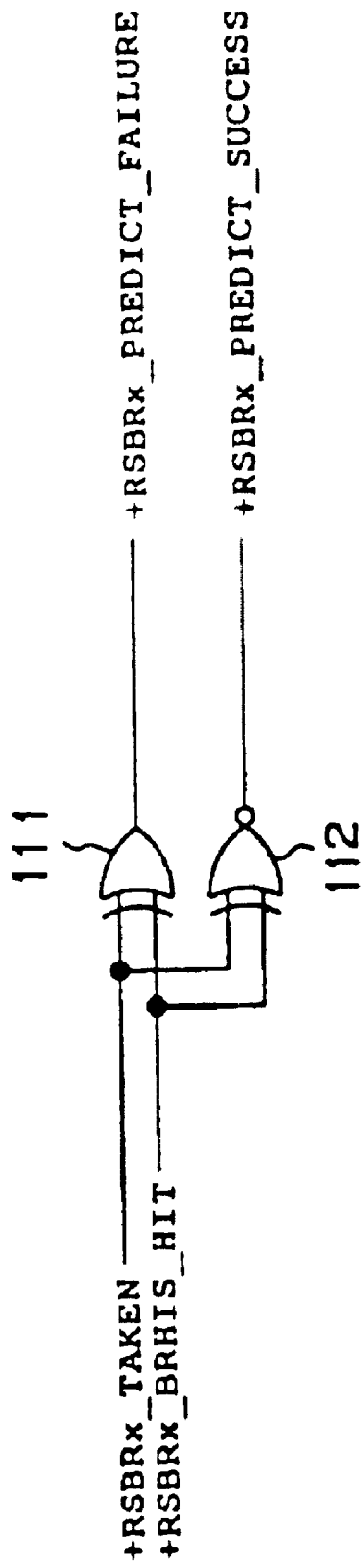
FIG. 23 shows an example of the circuit (1) for actually fetching and canceling a branch instruction prefetching operation.

FIGS. 23 and 24 show examples of the circuits for actually fetching and canceling a branch instruction prefetch request.

In the circuit shown in FIG. 23, a branch/non-branch flag (+RSBRx_TAKEN), and a branch prediction flag (+RSBR_BRHIS_HIT) are input from the reservation station RSBRx to the EXOR circuits 111 and 112 to obtain an exclusive logic sum. If one of the branch/non-branch flag (+RSBRx_TAKEN) and the branch prediction flag (+RSBR_BRHIS_HIT) is "0", that is, branching occurs and a non-branch is predicted, or branching does not occur and a branch is predicted, then a branch prediction failure flag (+RSBRx_PREDICT_FAILURE) of "1" is output from the EXOR circuit 111. On the other hand, if branching occurs and a branch is predicted, or branching does not occur and a non-branch is predicted, then a branch prediction success flag (+RSBRx_PREDICT_SUCCESS) of "0" is output.

Figure 24A:
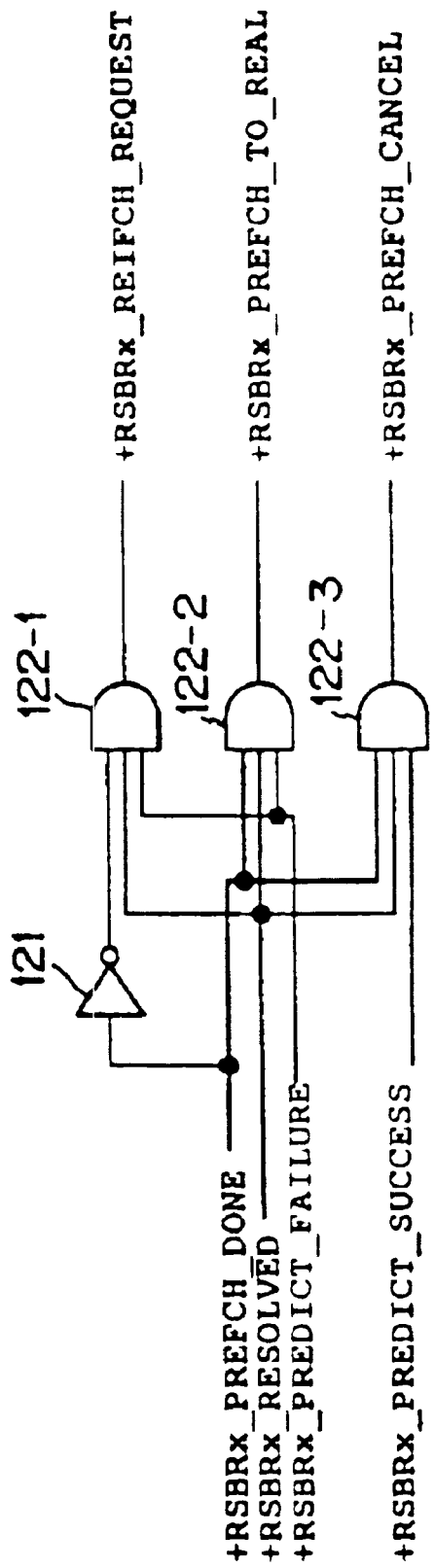
FIG. 24 shows an example of the circuit (2) for actually fetching and canceling a branch instruction prefetching operation.

In FIG. 24A, a branch prediction success/failure flag from the circuit shown in FIG. 23 is input to AND circuits 122-1 through 122-3, and the prefetch requested flag (+RSBRx_PREFCH_DONE), and the branch condition code determination flag (+RSBRx_RESOLVED) are input from the branch instruction reservation station RSBRx to an inverter 121 and the AND circuits 122-1 through 122-3. The prefetch requested flag (+RSBRx_PREFCH_DONE) is input to the AND circuits 122-2 and 122-3, and is logically inverted and input to the AND circuit 122-1. In addition, the branch condition code determination flag (+RSBRx_RESOLVED) is input as is to the AND circuits 122-1 through 122-3. Furthermore, the branch prediction failure flag (+RSBRx_PREDICT_FAILURE) is input to the AND circuits 122-1 and 122-2, and the branch prediction success flag (+RSBRx_PREDICT_SUCCESS) is input to the AND circuit 122-3. If the prefetch request has not been completed, the branch condition code has been determined, and the branch prediction has failed, then the refetch request for an instruction in the branch instruction reservation station RSBRx is issued from the AND circuit 122-1. If the prefetch request has been completed, the branch condition code has been determined, and the branch prediction has failed, then a signal (+RSBRx_PREFCH_TO_REAL) for a change of the prefetch of the branch instruction reservation station RSBR into actual fetch is output from the AND circuit 122-2. In addition, if the prefetch request has been completed, the branch condition code is determined, and the branch prediction is successful, then the instruction is not prefetched, but can be directly fetched, thereby outputting a signal (+RSBRx_PREFCH_CANCEL) for cancellation of the instruction prefetch from the AND circuit 122-3.

Figure 24B:
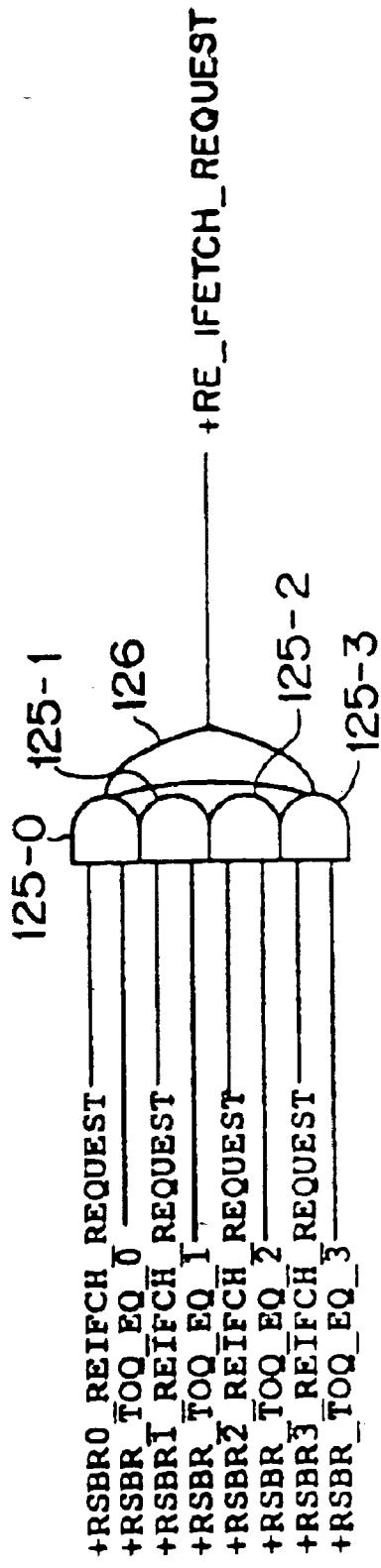

FIG. 24B shows an example of a circuit for generating a signal for issuing an instruction refetch request.

Refetch request signals (+RSBR0-3_REIFCH_REQUEST) of the branch instruction reservation stations RSBR0 through RSBR3 are input from the circuit shown in FIG. 24A. These signals and the signals (+RSBR_TOQ_EQ_0-3) indicating the execution order of the branch instruction reservation stations RSBR0 through RSBR3 shown in FIG. 16 are ANDed in AND circuits 125-0 through 125-3. The OR of these values is obtained by an OR circuit 126, thereby generating the instruction refetch request (+RE_IFETCH_REQUEST). Accordingly, if a refetch request signal has arrived at any branch instruction reservation station RSBRx, and the execution order of the branch instruction reservation station RSBRx is satisfied, the instruction refetch request is to be issued.

Figure 25:
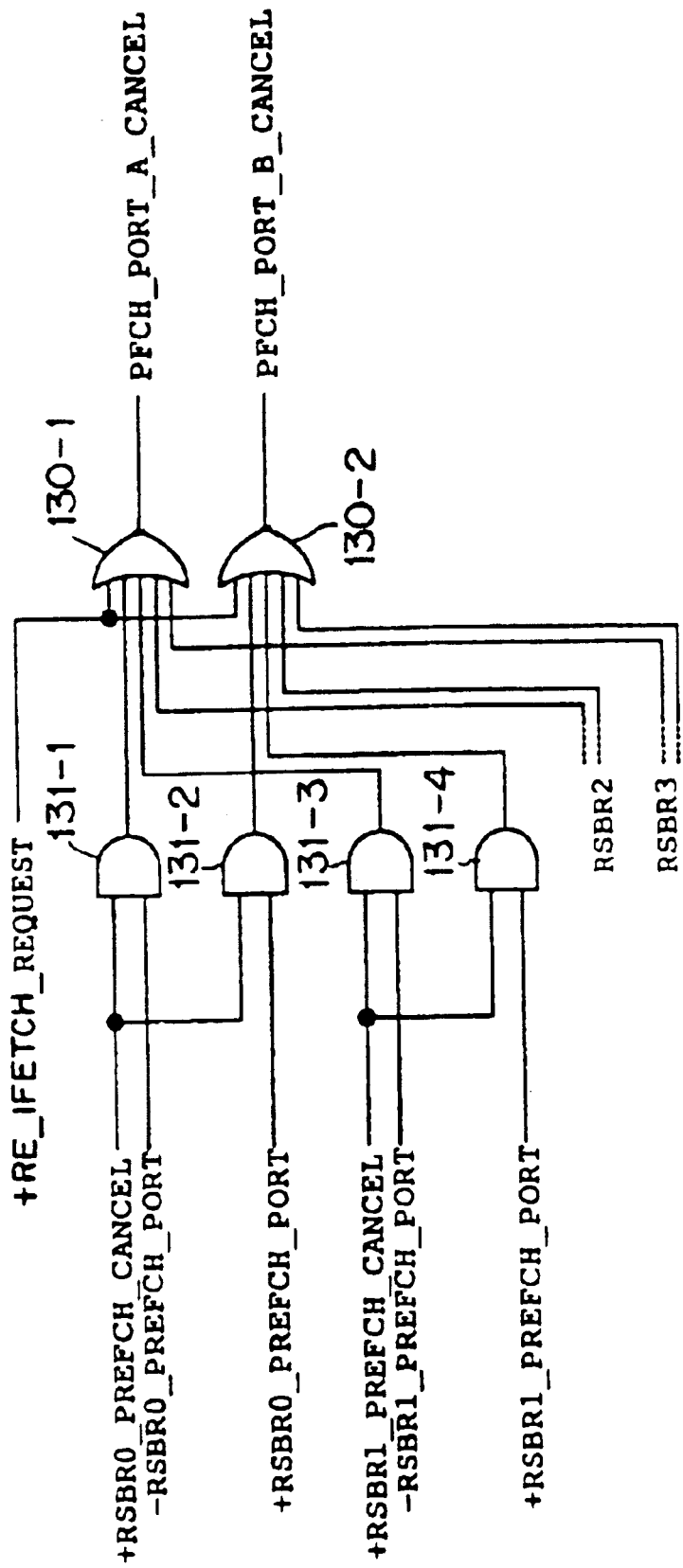
FIG. 25 shows an example of the circuit for generating a signal for cancellation of a branch instruction prefetching operation for each port.

FIG. 25 shows an example of the circuit for generating a signal for cancellation for each port of branch instruction prefetch.

The circuit shown in FIG. 25 inputs the instruction refetch request (+RE_IFETCH_REQUEST) output from the circuit shown in FIG. 24B to OR circuits 130-1 and 130-2, receives inputs from AND circuits 131-1 through 131-4 provided respectively corresponding to the branch instruction reservation stations RSBR0 through RSBR3, generates cancel signals of the branch instruction prefetch ports A and B shown in FIG. 13, and inputs the signals to the instruction fetch control unit 9. The branch instruction reservation stations RSBR0 through RSBR3 have identical circuit configurations. Therefore, only the branch instruction reservation station RSBR0 is described below.

First, the instruction prefetch cancel signal (+RSBR0_PREFCH_CANCEL) and the inverse logic signal (−RSBR0_PREFCH_PORT) of the prefetch port number stored in the branch instruction reservation station RSBR0 are input from the circuit shown in FIG. 24A to the AND circuit 131-1. These signals are ANDed by the AND circuit 131-1. Since there are two instruction prefetch ports A and B, it is assumed that, for example, "0" is assigned to the port A, and 1 is assigned to the port B. Then, an instruction prefetch cancel signal is input to the AND circuit 131-1. If the prefetch port is A, the AND circuit 131-1 inputs a signal of the logic of "1" to the OR circuit 130-1. Therefore, a cancel signal (PFCH_PORT_A_CANCEL) of the port A is output from the OR circuit 130-1. When the port B is used, an instruction prefetch cancel signal is input to the AND circuit 131-2. When the port B is specified, a cancel signal (PFCH_PORT_B_CANCEL) of the port B is output. When an instruction refetch request (+RE_IFETCH_REQUEST) is issued, both ports A and B are canceled.

Thus, signals are processed for the branch instruction reservation stations RSBR0 through RSBR3. When any one of the cancel conditions is met, the OR circuit 130-1 outputs a cancel signal (PFCH_PORT_A_CANCEL) of the port A, and the OR circuit 130-2 outputs a cancel signal (PFCH_PORT_B_CANCEL) of the port B Described below is the control performed when a store instruction exists in an executable instruction sequence.

It is necessary to detect that the store instruction can rewrite a fetch instruction sequence by comparing the write address of the store instruction with the address of the instruction sequence requested to be fetched. This is an event to be considered in the branch instruction prefetch according to the embodiment of the present invention as well as in the normal instruction fetching process.

In the main storage device (or a cache mechanism), when a write instruction is issued by a store instruction until the resultant instruction sequence is returned to the instruction control unit, the result reflecting the write by the store instruction can be returned in many cases. In these cases, in the method of managing a result on the instruction control device side, that is, only when a circuit in which the cache mechanism (or the main storage device) does not manage the write of the store instruction is included, it should be detected that the store instruction can rewrite the branch instruction prefetch instruction sequence, and countermeasures should be taken. It is obvious that the possibility should be constantly checked to take appropriate action if the main storage device (or a cache mechanism) has no such mechanisms.

Assuming that the instruction sequence prefetched for a branch instruction is represented by a total of 16 bytes, and the length of a data string to be stored by a store instruction is a maximum of 16 bytes, the following condition should be met on the difference between the storage target address value and the prefetch address value in consideration of a 1-byte write possible at an address. That is, when the following expression exists, the above described overwrite can be performed.

$$-16 < \text{storage target address} - \text{prefetch address} < 16$$

Figure 26:
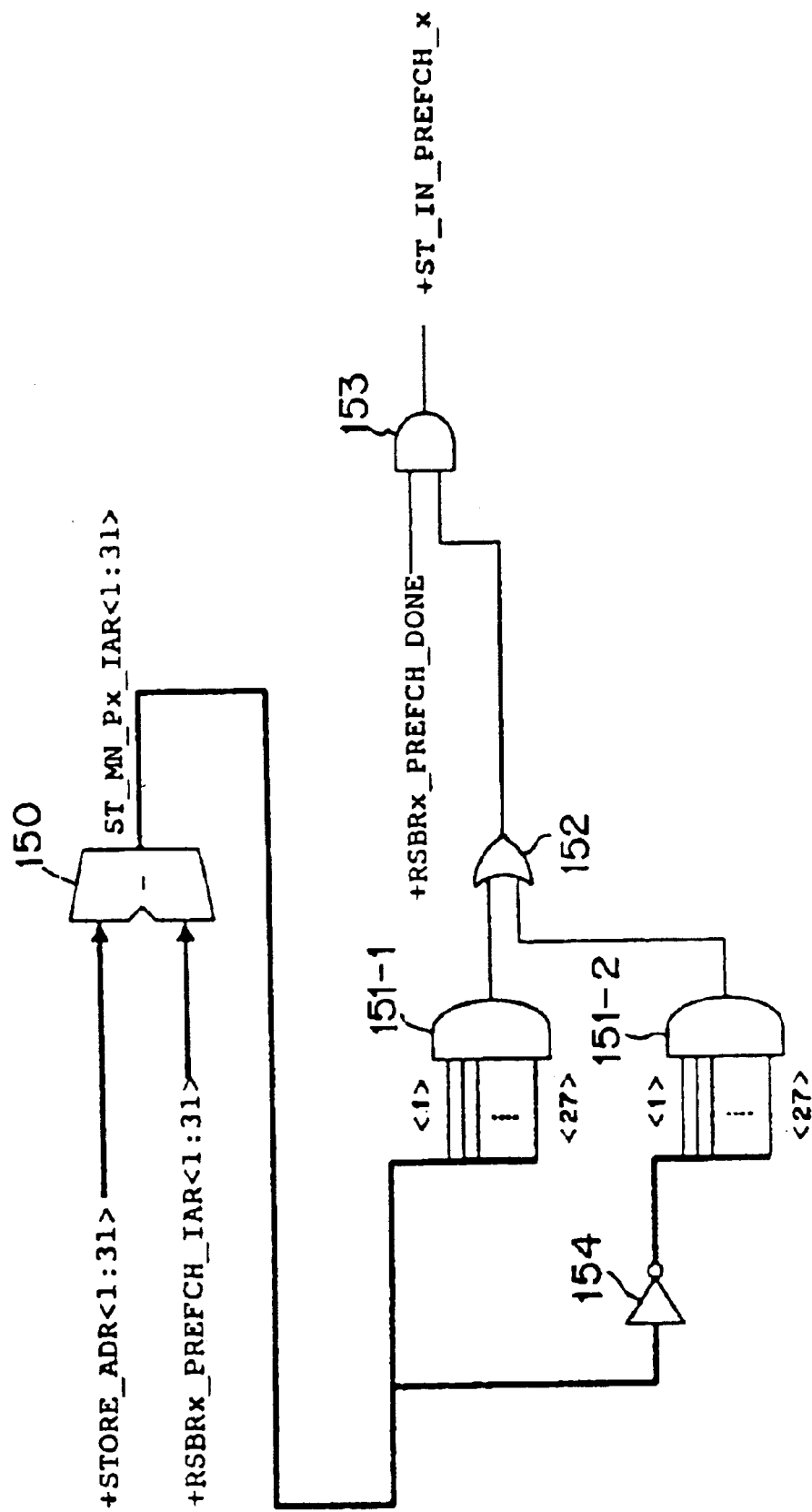
FIG. 26 shows an example of the circuit for detecting that a store instruction can rewrite a branch instruction prefetch instruction sequence.

FIG. 26 shows an example of the circuit for detecting that a store instruction can rewrite a branch instruction prefetch instruction sequence.

In FIG. 26, +STORE_ADR is a storage target address, +RSBRx_PREFCE_IAR is a prefetch address of the branch instruction reservation station x (that is, the output shown in FIG. 18), and +ST_MN_Px_IAR is the difference between the two addresses. +ST_IN_PREFCH_x is a signal indicating that it is detected that there is the possibility that a branch instruction prefetch instruction sequence requested by a branch instruction in the branch instruction reservation station x can be rewritten by a store instruction.

Therefore, according to the present embodiment, FIG. 18 shows the circuit for selecting and providing an address of the instruction subsequent to the current branch instruction or a branch target address stored in the branch instruction reservation station RSBRx as a necessary prefetch address for the detection circuit.

If a branch instruction prefetch request is canceled when it is determined that there is the possibility that a store instruction can rewrite the branch instruction prefetch instruction sequence, then a logical sum of the possibility determination signal and other request cancellation factor are obtained and transmitted to the instruction cache or the main storage device.

In FIG. 26, a subtracter 150 obtains the difference between the storage target address (+STORE_ADR) and the prefetch address (+RSBRx_PREFCH_IAR) to generate a difference signal (+ST_MN_Px_IAR). Then, an AND circuit 151-1 ignores four lower bits in +ST_MN_Px_IAR, and inputs 27 higher bits. When the difference obtained by subtracting the prefetch address from the store target address is positive and smaller than 16, the difference signal, that is, the higher 27 bits excluding the lower 4 bits, indicates all "0". Therefore, the output of the AND circuit 151-1 is "0". On the other hand, the higher 27 bits excluding the lower 4 bits of the signal obtained by logically inverting +ST_MN_Px_IAR are input to a AND circuit 151-2. If the difference of the address is positive and smaller than 16, then all bits input to the AND circuit 151-2 are all "1", and the output from the AND circuit 151-2 is "1". They are input to an OR circuit 152 to obtain a logical sum, and then input to an AND circuit 153. The prefetch requested flag (+RSBR_PREFCH_DONE) has been input from the branch instruction reservation station to the AND circuit 153, and a signal (+ST_IN_PREFCH_x) indicating that there is the possibility of an overwrite is output as H only when the prefetch has been requested.

When the difference between the above described addresses is negative and larger than −16, the logic of the +ST_MN_Px_IAR is inverted in the process above. As a result, the AND circuit 151-1 outputs "1", and the AND circuit 151-2 outputs "0". In this case, only if the prefetch has been requested, a signal (+ST_IN_PREFCH_x) is output. Then, the signal (+ST_IN_PREFCH_x) is input to the main storage device, etc., and the prefetch is canceled so that the fault due to the overwrite can be avoided.

In the above described embodiment, 'x' of the RSBRx, PORTz, etc. indicates the number of a branch instruction reservation station, a port, etc. The circuit described with a signal using 'x' can be provided for each of the branch instruction reservation stations or the ports.

In the above described embodiments, a practical method of computing a prefetch address is not explained, however an appropriate prefetch address can be computed for use as necessary by a person of ordinary skill in the art when the instruction prefetch mechanism according to the embodiments of the present invention can be effectively used. An embodiment of the operations of the prefetch address can be to instruction-prefetch the address of a non-predicted target, not the branch target address of a predicted branch. As a result, even if a branch prediction fails, another branch target, that is, an instruction at the address of a predicted branch, has already been prefetched, thereby effectively improving the instruction process speed.

According to the above described embodiments, the configurations for solving the first and second problems, although described separately above, can be incorporated together into an information device for higher efficiency, which can be easily recognized and realized by a person of ordinary skill in the art.

In the above mentioned embodiment, an instruction prefetching process is performed once for an actual instruction fetching process. Described below is an embodiment in which the instruction prefetching process is performed based on the previously prefetched instruction.

Figure 27:
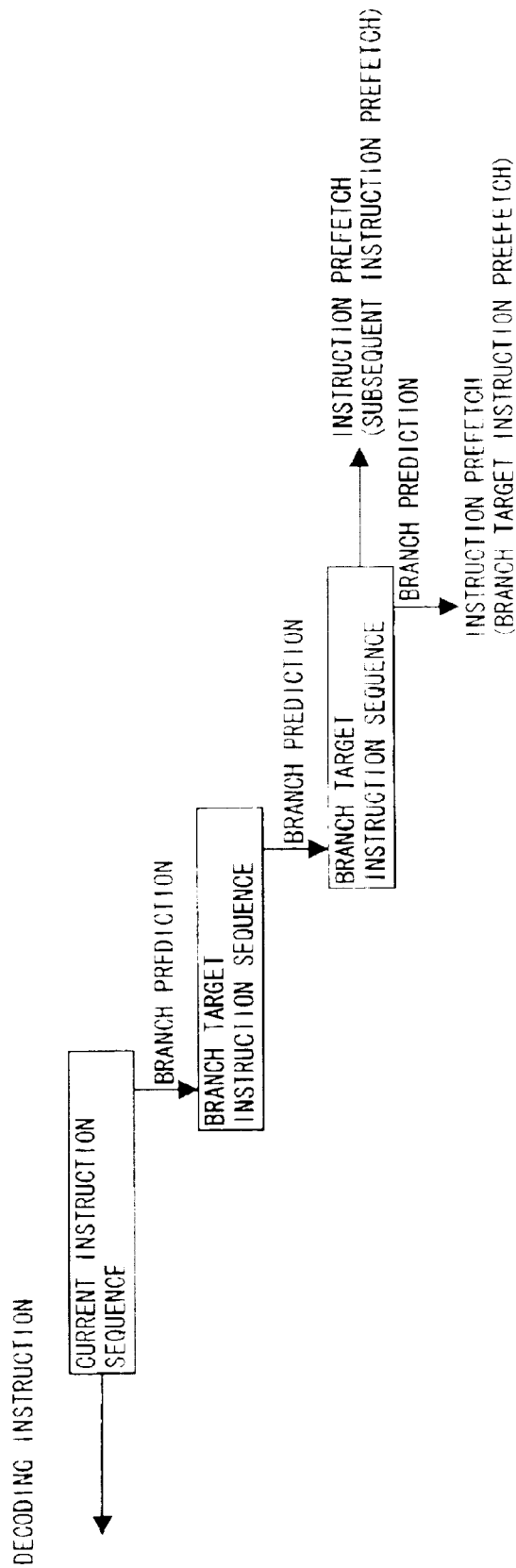
FIG. 27 shows the concept of the process of performing an instruction in the above mentioned embodiment.

FIG. 27 shows the concept of the process of performing an instruction in the above mentioned embodiment.

In FIG. 27, a frame in solid lines indicates an actual instruction fetch. That is, first, instructions in the currently fetched instruction sequence are decoded, a branch prediction is made as processes are performed, and a sequence of branch target instructions is fetched. Then, as the branch target instruction is fetched, a branch prediction is made, and the farther sequence of branch target instructions is fetched. Then, a branch prediction is made as to whether or not an instruction prefetching process (subsequent instruction prefetching process) is made on the instruction subsequent to the sequence of branch target instructions, and the branch target instruction is prefetched.

However, in the above mentioned embodiment, the instruction to be prefetched is only the instruction sequence in the subsequent instruction fetch request, which limits the effect of the instruction prefetching process. In the above mentioned embodiment, an temporary instruction buffer for use in an instruction decoding process is physically limited by the following two points.

- the length of consecutive instruction sequences having consecutive addresses
- the number of discontinuous points (branch inctructions for which a branch is predicted) of consecutive (predicted) instruction sequences whose addresses are not consecutive, but coutinuous as an execution path by a branch prediction.

As shown in FIG. 27, it has only been possible that an instruction prefetching process can be performed on a subsequent instruction immediately after the physical limit of the instruction fetching process or a branch target instruction (or on a subsequent instruction, for which a branch has not been predicted, for the case in which a branch prediction fails).

In the following embodiment, the above mentioned processes are standardized to trace farther instructions. Especially, they are extended to process an instruction sequence to be consecutively processed at an instruction prefetch request. That is, an instruction prefetch request is protected from the physical limit such as the size of a temporary buffer for an instruction fetching process.

Figure 28:
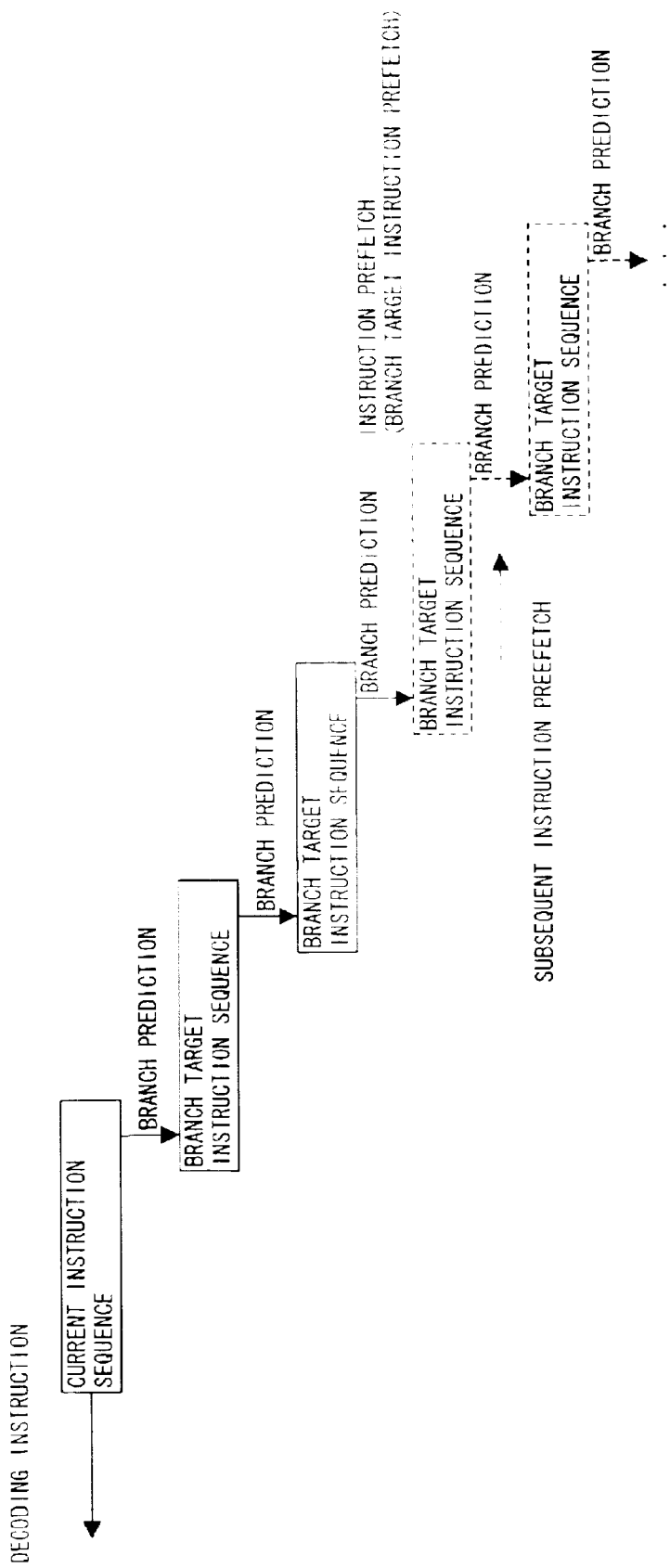
FIG. 28 shows the concept of the present embodiment.

FIG. 28 shows the concept of the present embodiment.

That is, the current instruction sequence is actually fetched at the upper portion shown in FIG. 28, and the instructions are decoded. At this time, a branch is predicted, and actual instructions of a branch target instruction sequence are fetched. Furthermore, a branch is predicted for a branch target instruction sequence, and the subsequent sequence of branch target instructions are actually fetched. At the next stage, a branch is predicted, and a subsequent instruction is prefetched or a branch target instruction is prefetched. According to the present embodiment, a further branch is predicted based on the instruction-prefetched sequence of branch target instructions, and the subsequent sequence of branch target instructions is instruction-prefetched.

In the above mentioned extending process, the function of a trace cache process can be easily designed at a lower cost by combining a common cache memory in which the trace cache system is not adopted with a branch prediction unit such as a branch history, etc.

FIG. 29 is a flowchart of the basic flow of the process according to the present embodiment.

First, assuming that an instruction re-fetching process is performed in the first step S1, it is determined in step S2 whether or not a temporary instruction buffer is full. If the temporary instruction buffer is not full, an instruction fetching process is performed, and control is returned to step S2. If the temporary instruction buffer is full in step S2, control is passed to step S4 or S5 depending on whether a branch prediction is made but a branch target fetching process cannot be performed, or a subsequent instruction cannot be fetched because a branch is not predicted.

In step S4, a branch prediction is made but a branch target fetching process cannot be performed, a branch prediction target instruction prefetch mechanism is activated, an instruction prefetch address is set, and the instruction prefetch address is validated. In step S5, a subsequent instruction cannot be fetched because a branch is not predicted, a subsequent instruction prefetch mechanism is activated, an instruction prefetch address is set, and the instruction prefetch address is validated.

In step S6, it is determined whether or not an instruction re-fetch request has been issued again. If an instruction re-fetch request has been issued, control is passed to step S7, the temporary instruction buffer is cleared, and the instruction prefetch address is nullified in step S8. Then, control is returned to step S1.

Instep S6, if an instruction re-fetch request has not been issued, control is passed to step S9, and it is determined whether or not the temporary instruction buffer is full. If the temporary instruction buffer is not full, an instruction fetching process is performed (step S10), and control is returned to step S6.

If it is determined in step S9 that the temporary instruction buffer is full, control is passed to step S11, and it is determined whether or not a branch is predicted. If a branch is predicted, control is passed to step S12, the branch prediction target instruction prefetch mechanism is activated, the instruction prefetch address is updated, and control is returned to step S6. If no branch is predicted, the subsequent instruction prefetch mechanism is activated, an instruction prefetch address is updated, and control is returned to step S6.

That is, while a demand fetching process (actual instruction fetching) can be performed for subsequent instructions, the demand fetching process should be prioritized, and therefore the demand fetching process is actually performed.

When the demand fetching process cannot be performed (a hedge fetching process (a process of fetching a sequence of instructions for which a branch is not predicted) can or cannot be performed depending on the implementation), an instruction prefetching process on an instruction sequence for the subsequent process (including a branch prediction) is requested, a requested instruction prefetch address is stored, and the branch prediction mechanism is referenced according to the address.

When a demand fetching process can be performed, it is prioritized. If an instruction re-fetching process is requested when the execution instruction sequence is different from a predicted sequence, then the instruction prefetch address is nullified. If any of the above mentioned cases is true, an instruction prefetching process is performed, and the instructions of the execution sequence (the branch target instruction sequence if a branch is predicted, and otherwise the subsequent instruction sequence) after the previously registered address are prefetched, and the address is registered.

In addition, there is a mechanism including an instruction fetching process (hedge fetching process, etc.) of an alternate path (an instruction sequence for which an execution prediction is not made). However, it can be performed between a demand fetching process and a prefetching process, and the essential concept is described above.

Since an instruction prefetching unit also operates an LBS (local buffer storage) as the common instruction fetch request, the subsequent instruction fetch request (or an instruction prefetch request) can be interrupted by an instruction prefetching process.

That is, when a large number of instruction prefetch requests are issued, the related instruction prefetching process is accompanied with a memory transferring process between the LBS and lower order memory, and the common instruction fetch request actually required later can be forced to await for a long time in the worst case.

Figure 30:
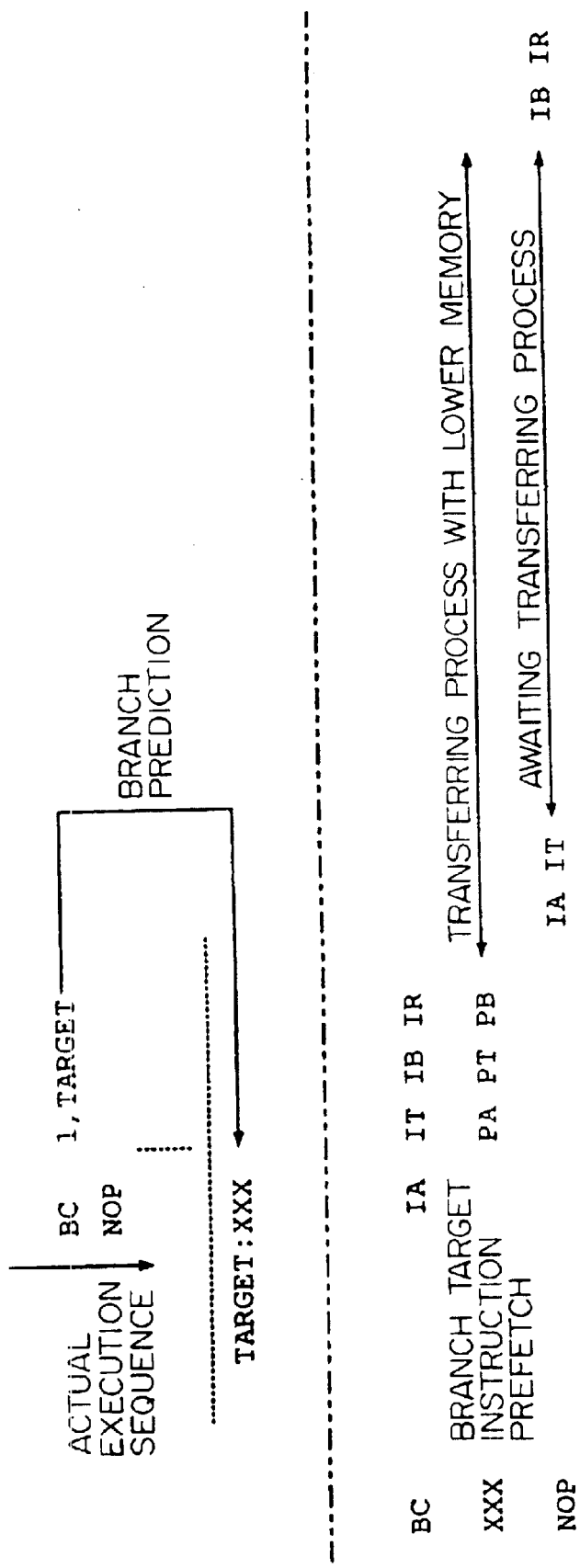
FIG. 30 shows the case in which an instruction fetch request is delayed by an instruction prefetch request.

FIG. 30 shows the case in which an instruction fetch request is delayed by an instruction prefetch request.

As shown at the upper portion in FIG. 30, assuming that a branch is predicted by BC, which is a branch inctruction, and XXX is predicted as a branch target instruction, a branch target instruction prefetching process (prefetching the XXX) proceeds in PA, PT, and PB cycles while the process of the BC proceeds in IA, IT, IB, and IR cycles as shown by the lower portion in FIG. 30. When the branch target instruction prefetching process proceeds to the PB, the data transferring time is required to prefetch a branch target instruction from lower memory. Then, although the execution of the NOP, which is the instruction subsequent to the BC, starts, the lower memory cannot be accessed. Therefore, the execution of the NOP which has proceeded to the IA and IT cycles has to await the completion of the transferring process for the branch target instruction prefetching process, thereby considerably delaying the execution of the IB and IR cycles.

Otherwise, with the priority control configuration for the instruction fetching process and the instruction prefetching process, there is the possibility that a normal instruction fetch request cannot be issued.

Figure 31:
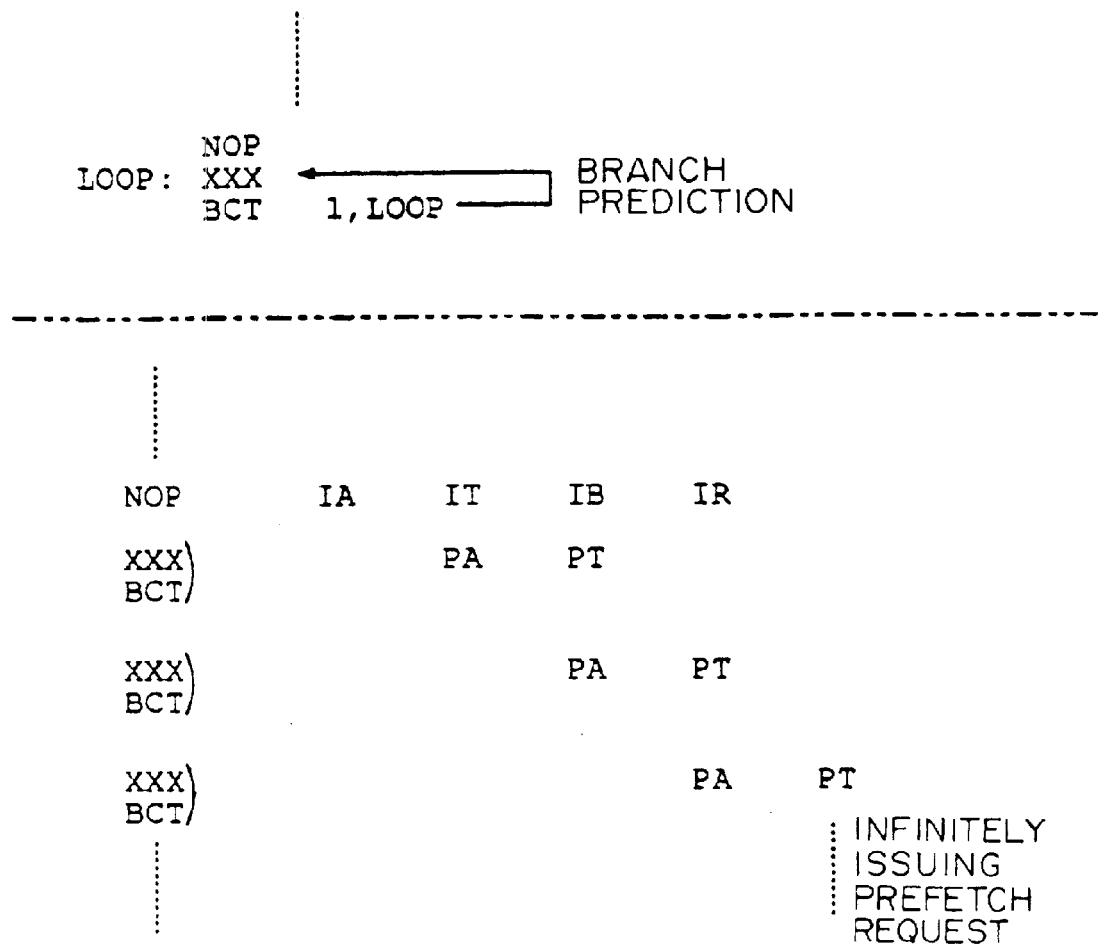
FIG. 31 shows the case in which there may arise a problem if an instruction prefetch request can be issued without restrictions.

FIG. 31 shows the case in which there may arise a problem if an instruction prefetch request can be issued without restrictions.

The example, as shown by the upper portion in FIG. 31, shows an instruction sequence in which an XXX and a BCT are repeated predetermined times by a branch count instruction. By a branch prediction, it is predicted that the BCT branches to the XXX. Therefore, as shown at the lower portion in FIG. 31, the execution predicted instruction sequence is presented as NOP, XXX, BCT, XXX, BCT, XXX, BCT, . . . In the sequence, the instruction sequence of the XXX and the BCT is a branch target instruction for the BCT immediately before in the second and later process. Therefore, a prefetch request is repeatedly issued by the branch target instruction prefetching process. If the first instruction sequence XXX and BCT, which are the subsequent instructions to the NOP, is first issued for an subsequent instruction prefetching process, and if the branch target instruction prefetching process is higher in priority than the subsequent instruction fetching process, the result is obtained as shown in FIG. 31, thereby suppressing the issue of the demand fetching instruction (subsequent instruction fetching instruction).

As a result, it is effective (or essential by an embodying method) to use a method of limiting to some extent the frequency of the instruction prefetch request.

Figure 32:
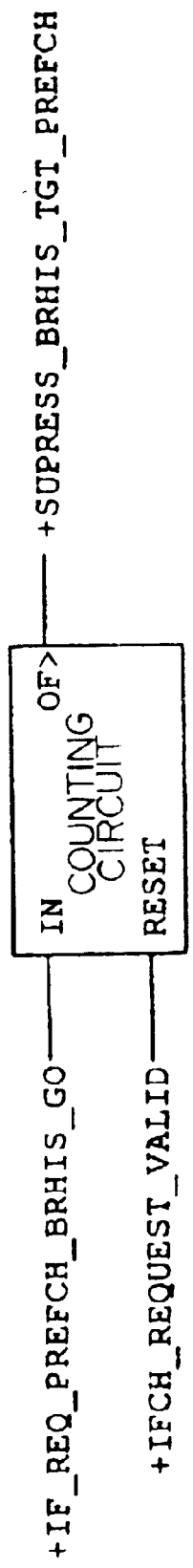
FIG. 32 shows an example of the configuration of an instruction prefetch suppression circuit.

FIG. 32 shows an example of the configuration of an instruction prefetch suppression circuit.

In the above mentioned embodiment, an instruction prefetch completion flag is set for each instruction fetch port to control an instruction prefetch request. In the present embodiment, a process of prefetching an instruction prefetch target instruction is required.

As a first example of the configuration according to the present embodiment, a simple recursive instruction prefetch unit is included.

When a priority circuit according to the above mentioned embodiment is included, a branch prediction target instruction prefetch request is higher in priority than a subsequent instruction demand fetching instruction. Therefore, as described above, there is the possibility of an instruction rejection (a subsequent instruction cannot be executed by the consecutive issue of a branch target instruction prefetch). Therefore, for example, when a branch target instruction prefetch request (+IF_REQ_PREFCH_BRHIS_GO) is issued more than predetermined times, a logic of suppressing (+SUPRESS_BRHIS_TGT_PREFCH) an instruction prefetch request until a demand fetching process is performed is configured. FIG. 30 shows this configuration. With the configuration shown in FIG. 30, the number of times a branch target instruction prefetch request is issued is counted by a count circuit. At this time, when a demand fetching process is performed, the rejection status can be avoided. As a result, +IFCH_REQUEST_VALID indicating that an instruction fetch request (not an instruction prefetch) has been issued is defined as a reset signal of the count circuit.

Figure 33:
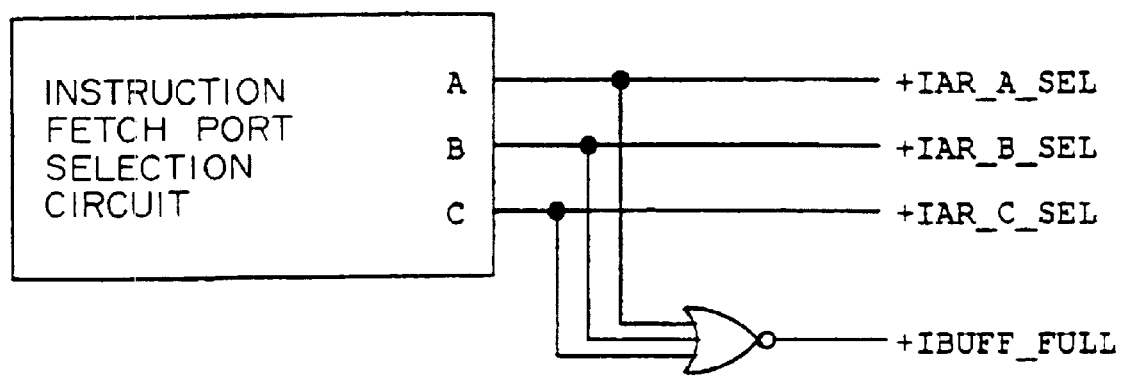
FIG. 33 shows an example of the configuration of a fetch port selection circuit required to switch an instruction prefetching process and a demand fetching process.

FIG. 33 shows an example of the configuration of a fetch port selection circuit required to switch an instruction prefetching process and a demand fetching process.

The instruction fetch port selection circuit shown in FIG. 33 performs an operation as to which operation is to be used to perform an instruction fetching process, and is a circuit for outputting an instruction signal. Since the detailed condiguration of the circuit is similar to that of the conventional technology, and the detailed explanation is omitted here.

In the configuration shown in FIG. 33, there are three ports A, IT, and C for use in performing an instruction fetching process. When all these three selection signals are output, a signal +IBUFF_FULL indicating that an instruction fetch port is full is output.

Figure 34:
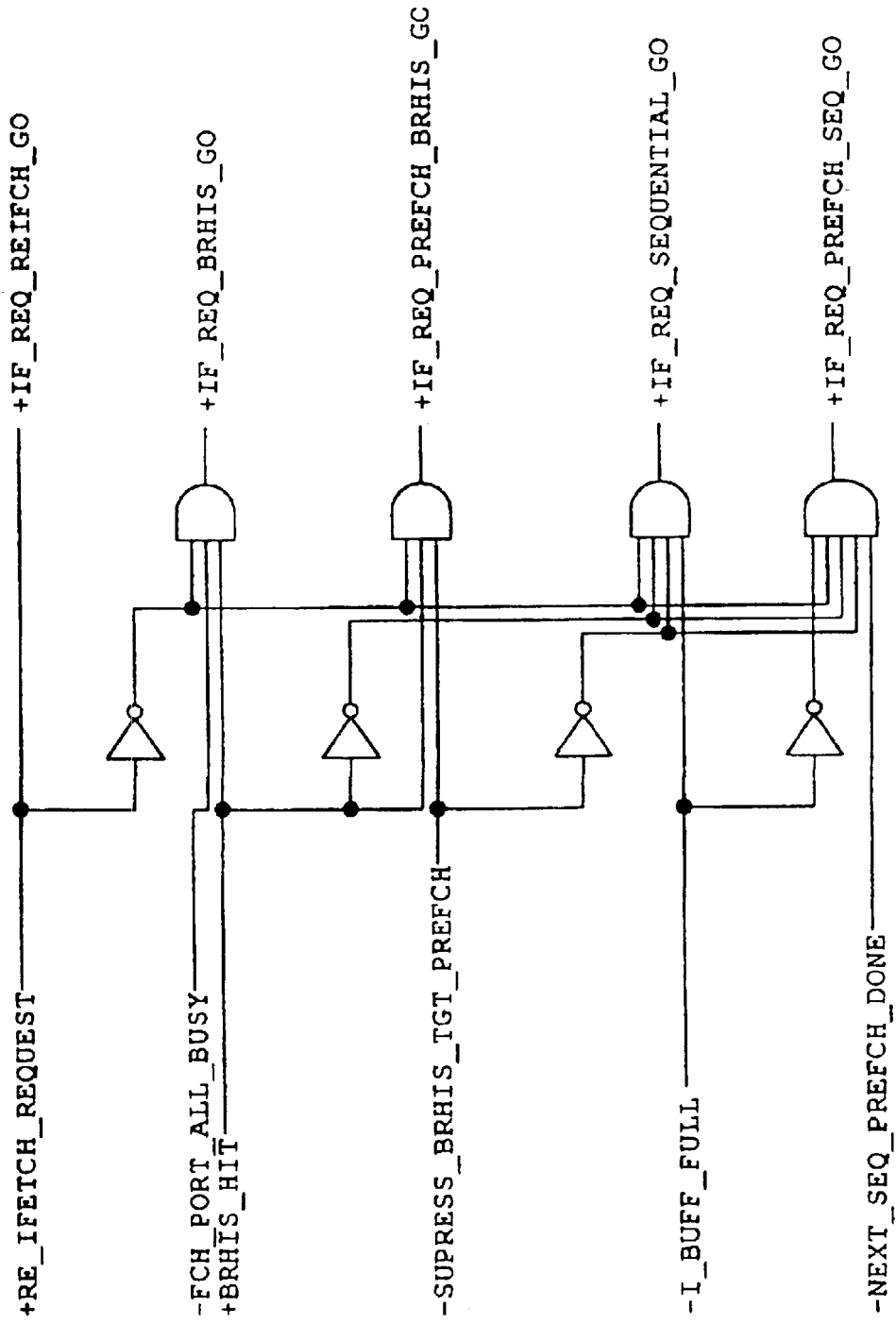
FIG. 34 shows an example of the configuration of the priority determination circuit reflecting the configuration shown in FIGS. 32 and 33.

FIG. 34 shows an example of the configuration of the priority determination circuit reflecting the configuration shown in FIGS. 32 and 33.

With the configuration shown in FIG. 34, a branch target instruction prefetch (or a subsequent instruction prefetch) corresponding to a previous request can be issued regardless of whether the request refers to a prefetching process or a demand fetching process based on the priority if no restrictions are placed by the above mentioned +SUPRESS_BRHIS_TGT_PREFCH. That is, the output +IF_REQ_PREFCH_BRHIS_GO is input to the count circuit shown in FIG. 32, and the number of times of the branch target instruction prefetch is counted. If the number reaches a predetermined value, -SUPRESS_BRHIS_TGT_PREFCH suppressing the branch target instruction prefetch is input to the priority determination circuit shown in FIG. 34, and the output of +IF_REQ_PREFCH_BRHIS_GO is suppressed.

With the configuration, the above mentioned rejection status is avoided, and a strong instruction prefetch can be issued.

Figure 35:
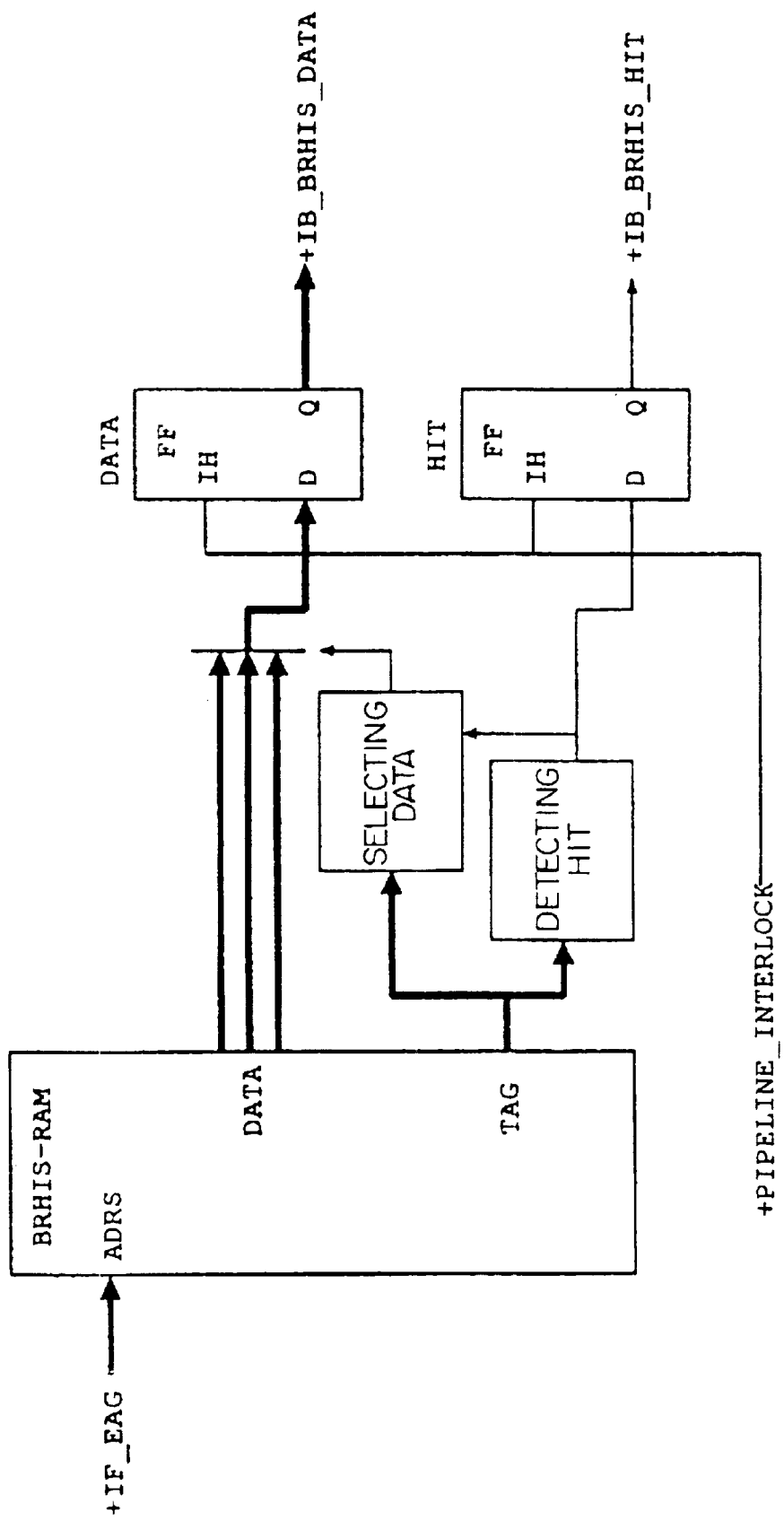
FIG. 35 shows a branch history searching circuit operated by an instruction prefetch according to the above mentioned embodiment.

FIG. 35 shows a branch history searching circuit operated by an instruction prefetch according to the above mentioned embodiment.

When the address +IF_EAG from an address calculator is input to a branch history, corresponding data and a TAG is output. Using the output TAG, a hit is detected, and the output data is selected. The data is selected based on an adopted set-associative system. Depending on the adopted system, it may not be required to select data. The output data and hit detection signal are output as +IB_BRHIS_DATA and +IB_BRHIS_HIT through an FF. At this time, a signal +PIPELINE_INTERLOCK indicating that an interlock has occurred in a pipeline is input to FFs for data and a hit signal. When an interlock occurs, the hit data and the hit signal of the branch history detected immediately before the interlock are held.

In this example, it is assumed that it takes $2\tau$ ($\tau$ indicates a machine cycle) to obtain a search result of the branch history. In the above mentioned embodiment, when instruction fetch data is awaited due to a cache mishit (when a pipeline interlock occurs), the search result of the branch history is held by a +PIPELINE_INTERLOCK signal while it is made to be synchronous with the pipeline. However, it is necessary to control the instruction prefetch to have it operate regardless of the pipeline interlock.

Figure 36:
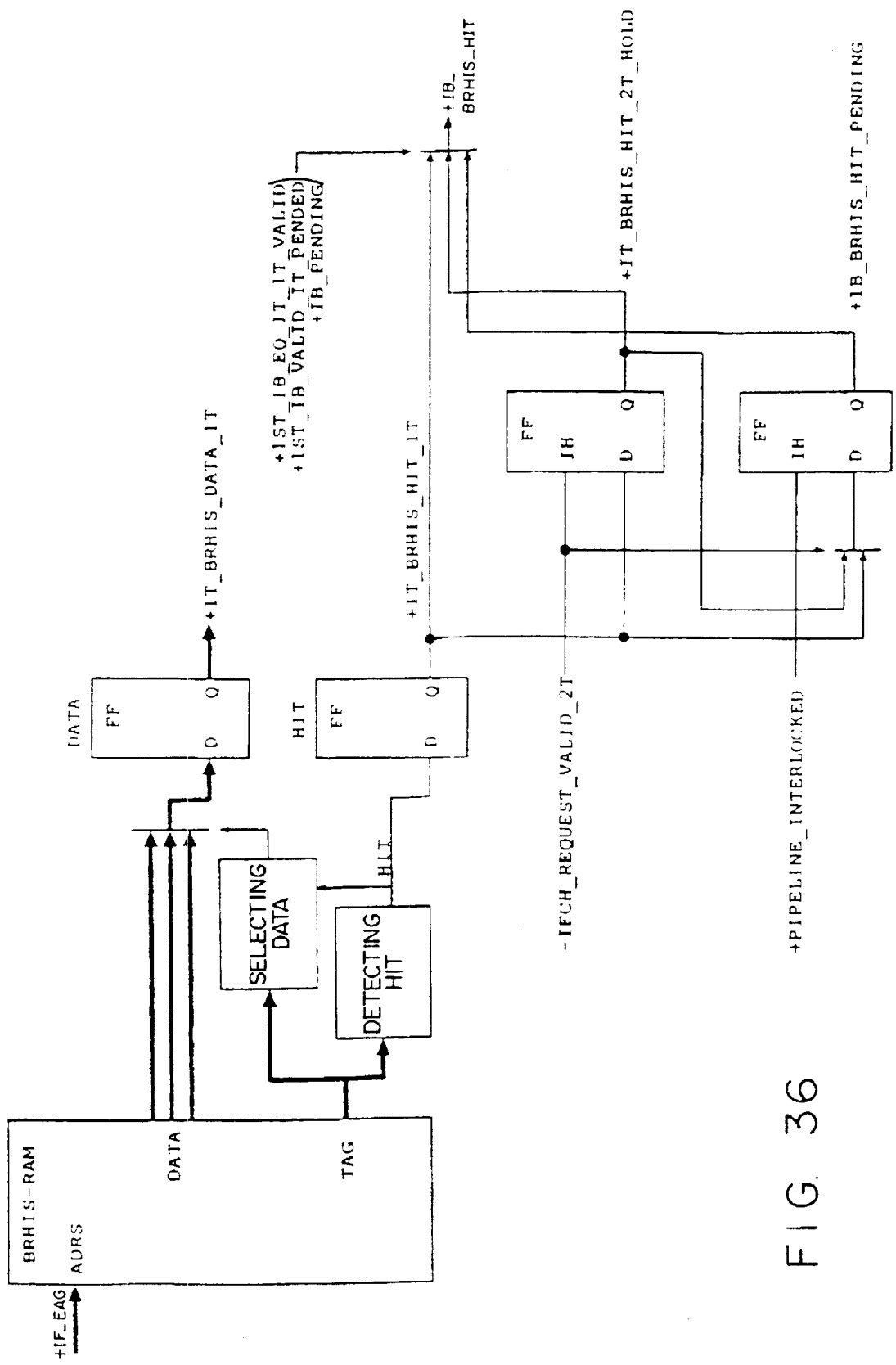
FIG. 36 shows an example of the configuration in which the present embodiment is applied to the branch history searching circuit shown in FIG. 35.

FIG. 36 shows an example of the configuration in which the present embodiment is applied to the branch history searching circuit shown in FIG. 35.

In this example, since the operations of the branch history, detecting a hit, selecting data, and the FF for data and a hit signal are the same as those shown in FIG. 35, the detailed explanation is omitted here.

In this example, an instruction fetch by a 4-stage pipeline comprising IA, IT, IB, and IR is assumed. In response to a search request, depending on the first IB at which a pipeline interlock occurs in the IT cycle, the IB cycle in which a pipeline interlock occurs, and the first IB cycle when no pipeline interlock occurs, the same signal as +IB_BRHIS_HIT according to the above mentioned embodiment can be generated.

That is, a +1ST_IB_EQ_IT_1T_VALID signal shown in FIG. 36 is used to output +IT_BRHIS_HIT_1T (hit signal) as +IB_BRHIS_HIT when no pipeline interlock occurs.

In addition, when a lock occurs in the IT cycle, -IFCH_REQUEST_VALID_2T is input, and the branch history hit signal generated in the second IT cycle in the IT cycles repeated due to the lock and the branch history hit signal generated in the first IB cycle after the lock in the IT cycle is released are held in an FF 200. The hit signal generated in the first IB cycle is also held in an FF 201 if a pipeline interlock occurs. When the IT cycle is locked, +1ST_IB_VALID_IT_PENDED allows +IT_BRHIS_HIT_2T_HOLD from the FF 200 as +IB_BRHIS_HIT.

When a process is locked in the IB cycle after a pipeline interlock has occurred, +PIPELINE_INTERLOCKED is input to the FF 201, and the hit signal generated in the second and subsequent IB cycles is held in the FF 201. Then, the +IB_BRHIS_HIT_PENDING output from the FF 201 by +IB_PENDING is output as +IB_BRHIS_HIT.

Figure 37:
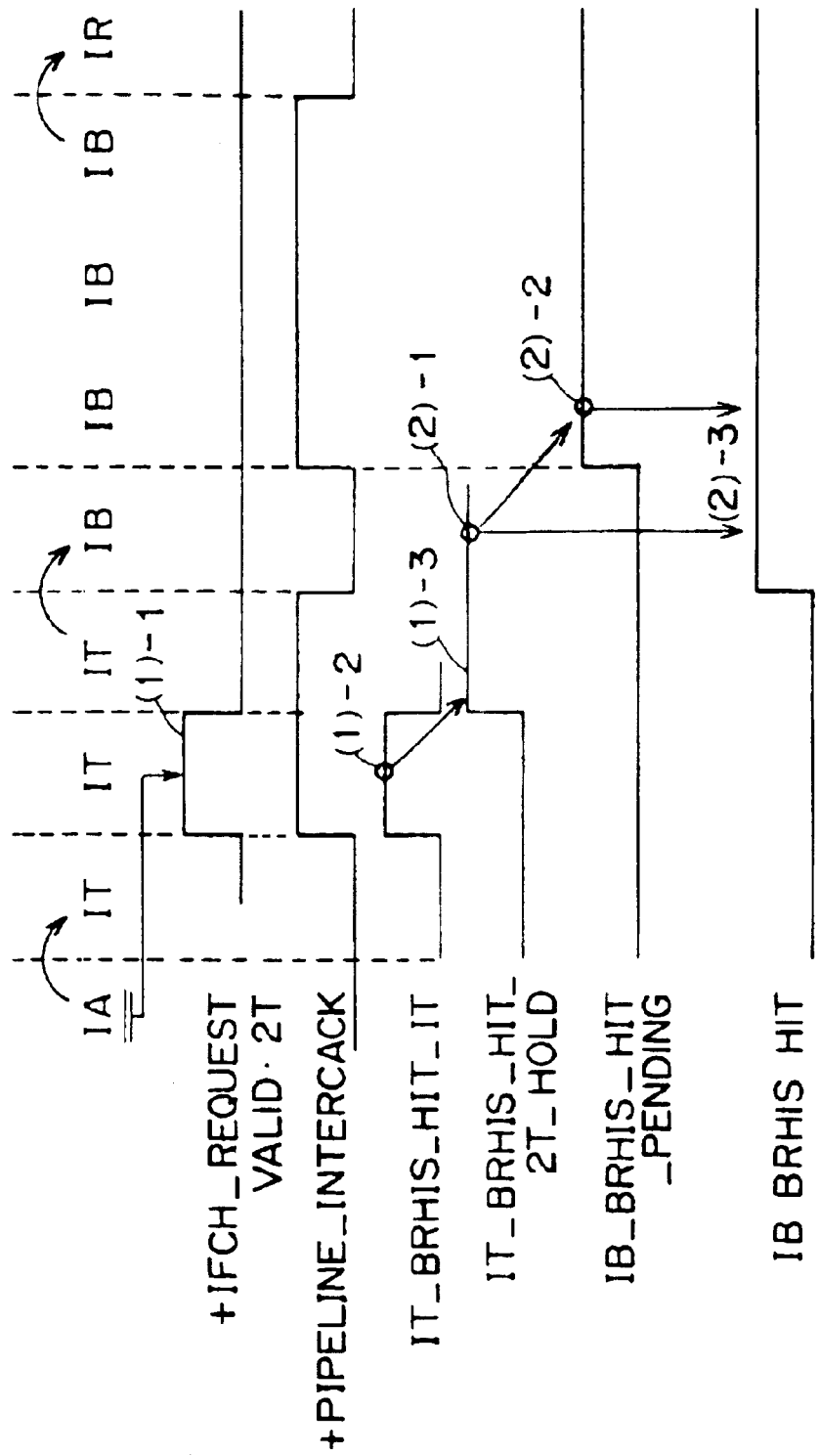
FIG. 37 is a timing chart for explanation of the operations shown in FIG. 36.

FIG. 37 is a timing chart for explanation of the operations shown in FIG. 36.

In FIG. 37, interlocks occur both in IT and IB cycles.

First, assume that the machine cycles are IA, IT, IT, IT, IB, IB, IB, IB, and IR. Since it takes $2\tau$ to obtain the search result of the branch history, the result of searching the branch history in the IA is obtained in the second IT. At this time, as shown by (1)-1, +IFCH_REQUEST_VALID_2T is invoked, and the hit signal at this time point is fetched to the FF 200. Assume that +PIPELINE_INTERLOCK has been invoked in the second and third IT cycles. Then, +IT_BRHIS_HIT_1T is invoked as shown by (1)-2, and the same signal is set in the FF 200, thereby invoking +IT_BRHIS_HIT_2T_HOLD as shown by (1)-3.

Assuming that the interlock is released, the IT cycles is switched into the IB cycle, and an interlock occurs again from the second IB cycle, the signal of +IB_BRHIS_HIT_PENDING is set ((2)-2). In addition, +IT_BRHIS_HIT_2T_HOLD holds the same signal until the next +IFCH_REQUEST_VALID_2T is set ((2)-1). If an interlock occurs in the IT cycle, but not in the IB cycle in a selector 202, then +IT_BRHIS_HIT_2T_HOLD is output as +IB_BRHIS_HIT. If an interlock occurs in the IB cycle, +IB_BRHIS_HIT_PENDING is output by +IB_PENDING as +IB_BRHIS_HIT ((3)-3).

With the above mentioned configuration, it can be detected that an instruction prefetch hits a branch history at any timing. The data is stored in the memory each time it is output, and read as necessary.

The second example of the configuration of the present embodiment is provided with a standard recursive instruction prefetch unit. The term 'recursive' indicates that subsequent prefetching processes are sequentially performed according to a prefetch instruction.

In this example, tracing (sequentially generating addresses to recursively performing an instruction prefetching process) can be performed by providing a register for holding an instruction prefetch address.

An instruction prefetch address is used in tracing addresses in an execution prediction instruction sequence, and the address updating condition is a successful instruction prefetch request.

Furthermore, when the execution of an instruction has to be performed again due to an instruction re-fetching process, interruption, etc., a previously read instruction prefetch is changed, that is, a predicted execution sequence is different from an actual execution sequence. Therefore, control is required to re-trace the instruction prefetch.

Figure 38:
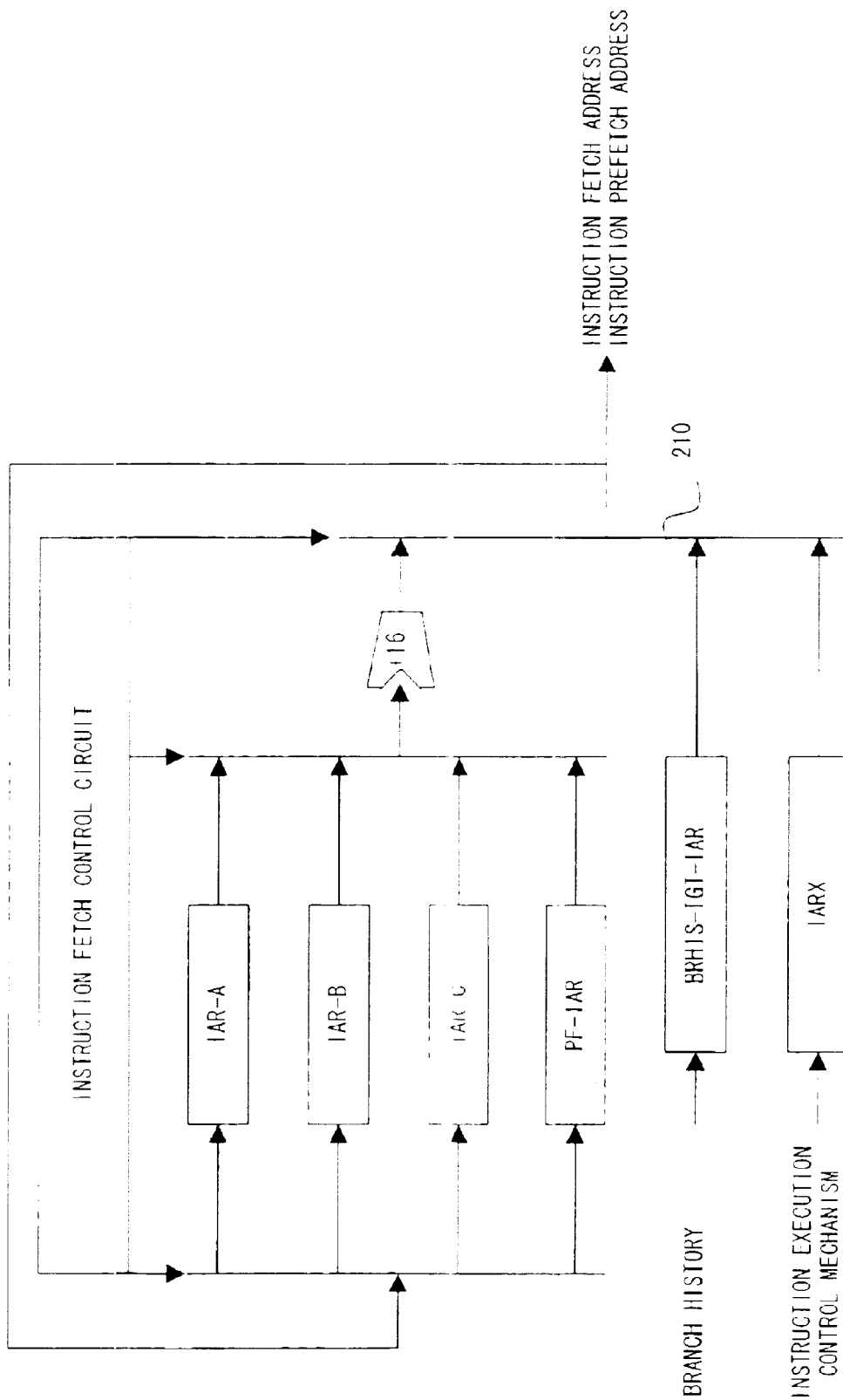
FIG. 38 shows an example of the configuration of an instruction fetch and a prefetch address generation circuit.

FIG. 38 shows an example of the configuration of an instruction fetch and a prefetch address generation circuit.

The instruction fetch control circuit shown in FIG. 38 contains a priority determination circuit, an instruction fetch port selection circuit shown in FIG. 33, etc. Except the prefetch function, the process is the same as in the above mentioned embodiment.

That is, the branch prediction result of the branch history is input to a selector 210 as BRHIS_TGT_IAR. The instruction re-fetch request from an instruction execution control mechanism is input to the selector 210 as IARX. The output from the selector 210 is input to one of fetch ports IAR-A through IAR-C and a port PF-IAR for a prefetch. The instruction fetch port selection circuit of the instruction fetch control circuit determines to which port the output of the selector 210, that is, an instruction fetch address or an instruction prefetch address. When the instruction fetch port selection circuit outputs +IBUFF_FULL, a prefetch port PF_IAR is selected. The address output from any of these instruction fetch ports is added to a predetermined value (16 in this example), and is output from the selector 210 as a subsequent instruction address.

Figure 39:
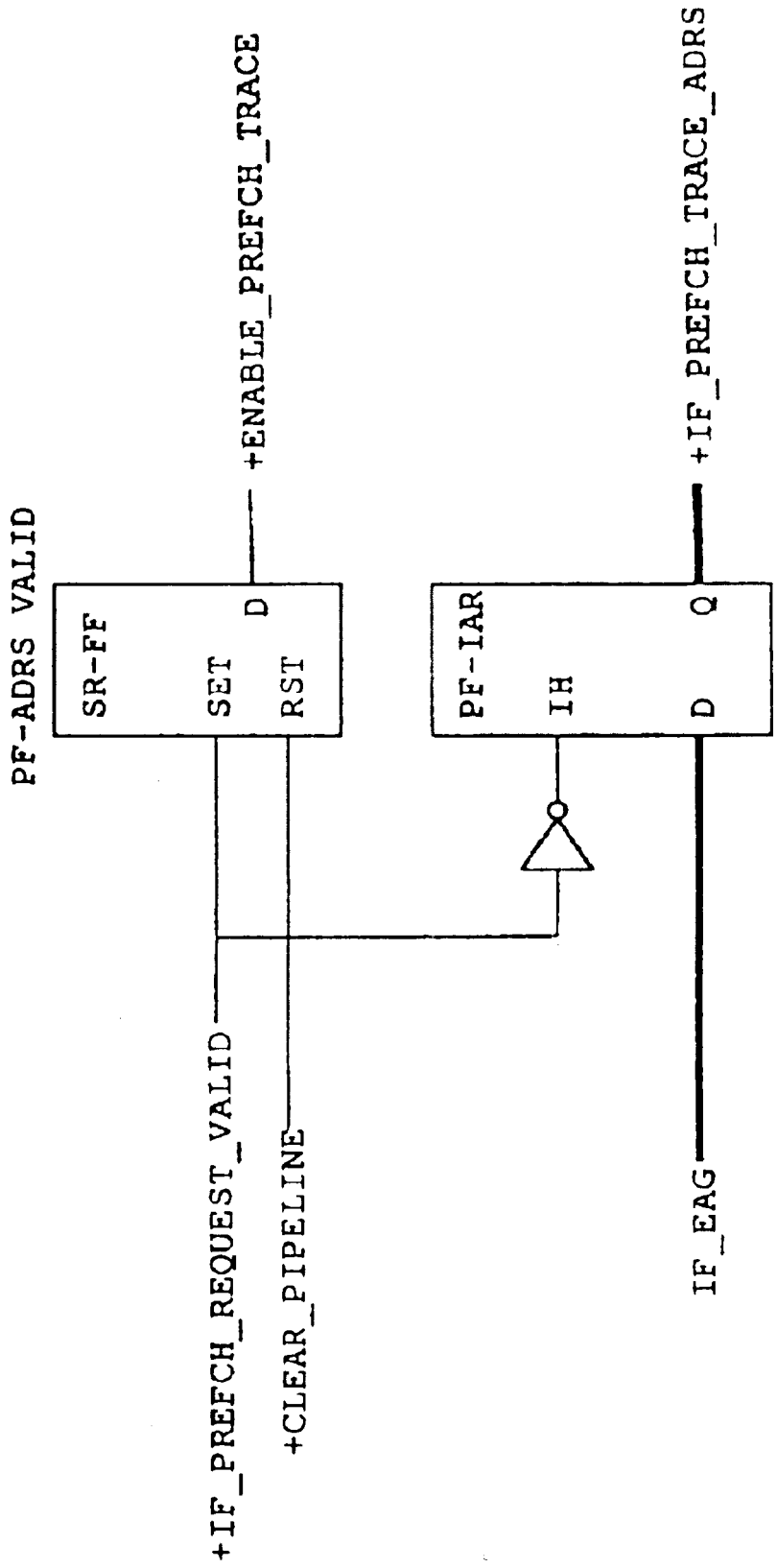
FIG. 39 shows an example of the configuration of the prefetch address generation circuit.

FIG. 39 shows an example of the configuration of the prefetch address generation circuit.

When the priority determination circuit described later performs a branch prediction target instruction prefetching process, its instruction prefetch address is first set, and the circuit shown in FIG. 39 becomes valid. If the circuit shown in FIG. 39 is valid, the instruction prefetch address is updated when a recursive instruction prefetch is issued. In addition, when a instruction re-fetching process is performed, +CLEAR_PIPELINE is issued, and the circuit is nullified.

That is, when a prefetch request is valid, a +IF_PREFCH_REQUEST_VALID signal is invoked, an enable signal +ENABLE_PREFCH_TRACE of an instruction prefetch is output through SR-FF, and an instruction prefetch address IF_EAG input at a timing of invoking a signal +IF_PREFCH_REQUEST_VALID is fetched to PF_IAR, and output as +IF_PREFCH_TRACE_ADRS. When +CLEAR_PIPELINE is input to SR_FF, the instruction prefetch enable signal +ENABLE_PREFCH_TRACE is reset, thereby ignoring the instruction prefetch address output from PF_IAR.

Figure 40:
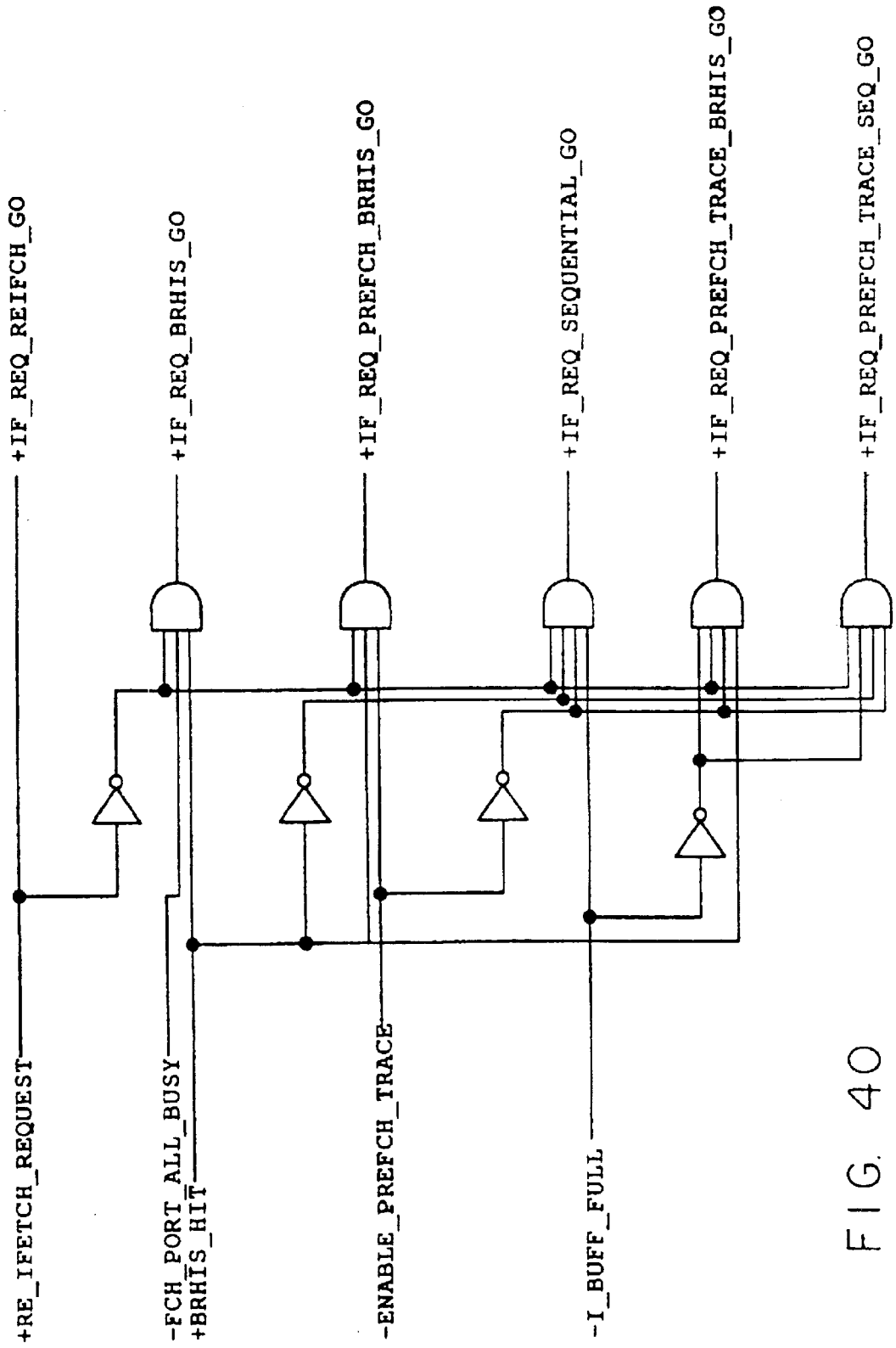
FIG. 40 shows an example of the configuration of the priority determination circuit with the present configuration.

FIG. 40 shows an example of the configuration of the priority determination circuit with the present configuration.

In this example, the instruction re-fetching process (+IF_REQ_REIFCH_GO) performed due to the case in which an instruction execution sequence is different from a branch prediction, the occurrence of interruption, etc. has the highest priority, the second highest priority is assigned to a branch target instruction fetch (+IF_REQ_BRHIS_GO) when a branch is predicted. Next in the priority order, when a branch is predicted with all instruction fetch port occupied, a branch target instruction prefetching process is performed (+IF_REQ_PREFCH_BRHIS_GO) also to invoke an instruction fetch. Then, a subsequent instruction (+IF_REQ_SEQUENTIAL_GO) when no branch is predicted, and a recursive instruction prefetch beyond (in tracing) the instruction prefetch (when a branch is predicted (+IF_REQ_PREFCH_TRACE_BRHIS_GO) and when no branch is predicted (+IF_REQ_PREFCH_TRACE_SEQ_GO)) are executed.

Figure 41:
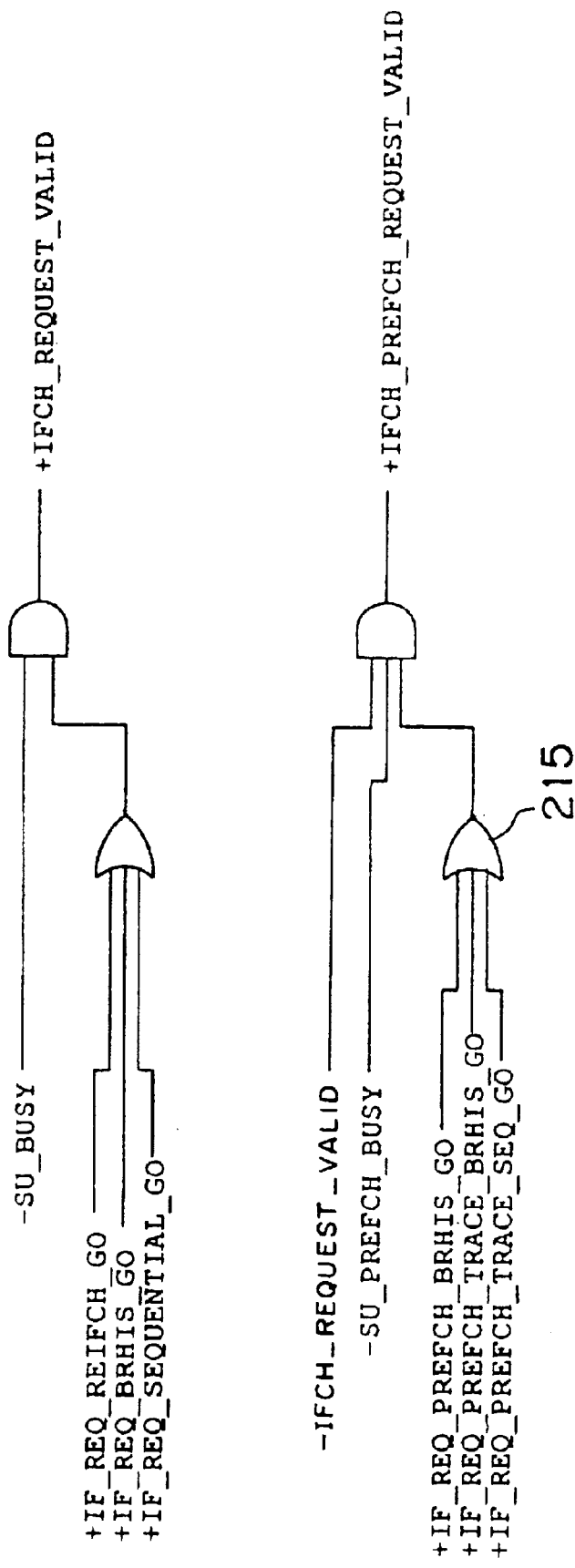
FIG. 41 shows an example of the configuration of the output circuit of a fetch/prefetch request signal for cache.

FIG. 41 shows an example of the configuration of the output circuit of a fetch/prefetch request signal for cache.

The circuit shown in FIG. 41 can be replaced with the circuit shown in FIG. 10, and the explanation of the same units as those shown in FIG. 10 is omitted here.

When +IFCH_REQUEST_VALID is output, it refers to a demand instruction fetch (actual instruction fetch). When +IF_PREFCH_REQUEST_VALID is output, it refers to an instruction prefetch request.

+IFCH_REQUEST_VALID is also used as a reset signal shown in FIG. 32. In FIG. 41, a recursive branch target instruction prefetch enable and a recursive subsequent instruction prefetch enable (+IF_REQ_PREFCH_TRACE_BRHIS_GO and +IF_REQ_PREFCH_TRACE_SEQ_GO) are provided as an input of an OR circuit 215 in addition to an enable signal +IF_REQ_PREFCH_BRHIS_GO of an branch target instruction prefetch.

As compared with FIG. 10, an enable for a recursive instruction prefetch is added, and a non-recursive subsequent instruction prefetch enable (+IF_REQ_PREFCH_SEQ_GO) is deleted because the configuration contains both non-recursive subsequent instruction prefetch enable and recursive subsequent instruction prefetch enable.

According to the above mentioned embodiment, the effect of a prefetching process that can be obtained with cache memory in the trace cache system can be expected at a lower hardware cost.

Therefore, it is not necessary to adopt the trace cache for instruction cache, thereby reducing the requirements of hardware.

According to the present invention, the delay time in processing an instruction can be shortened by prefetching an instruction which causes a delay such as a conditional branch instruction, etc.

What is claimed is:

1. An instruction fetch control apparatus controlling instruction fetch in an instruction control device having a cache memory unit, a lower memory unit, and an execution unit speculatively executing in a pipeline manner an instruction sequence stored in the cache memory unit, comprising:

an instruction fetch unit issuing an instruction fetch request to the cache memory unit for a target of a first branch instruction; and an instruction pre-prefetching unit pre-prefetching a target instruction sequence for a target of a second branch instruction, following the first branch instruction, by preliminarily transferring a predetermined instruction sequence, based on a past history, from said lower memory unit to said cache memory unit, when the target instruction sequence for the target of the first branch instruction not in said cache memory unit.

2. The apparatus according to claim 1, further comprising:

a branch prediction unit predicting a success or a failure of a branch instruction, and predicting a branch target address in a case of success of the branch instruction; and at least one buffer unit storing a fetched instruction sequence, wherein said instruction pre-prefetching unit preliminarily transfers a predicted instruction sequence corresponding to the predicted branch target address, from said lower memory unit to said cache memory unit when said buffer unit is not available regardless of the branch prediction made by said branch prediction unit, and when said cache memory unit does not contain the predicted target instruction sequence.

3. The apparatus according to claim 1, wherein said instruction pre-prefetching unit performs the instruction pre-prefetch to said cache memory unit when an instruction fetch request to be normally issued cannot be issued due to an interlocking factor.

4. The apparatus according to claim 1, further comprising a priority determination unit setting a priority depending on a type of instruction fetch including the pre-prefetch, and wherein said instruction fetch unit or said instruction pre-prefetch unit performs instruction fetch or instruction pre-prefetch to said cache memory unit based on the set priority.

5. The apparatus according to claim 1, further comprising a control unit having an instruction fetch inherit an instruction pre-prefetch, or bypassing to said buffer unit the instruction sequence being transferred to said cache memory unit when the instruction pre-prefetch is performed on an instruction sequence while the instruction sequence is being transferred by the instruction pre-prefetch to said cache memory unit.

6. The apparatus according to claim 1, wherein said instruction pre-prefetch unit does not continuously perform the instruction pre-prefetch for the same address or the same cache block.

7. The apparatus according to claim 1, wherein said instruction prefetch unit pre-prefetches instructions in a prefetched instruction sequence.

8. The apparatus according to claim 7, further comprising a suppression unit preventing the instruction pre-prefetch request from being infinitely issued.

9. The apparatus according to claim 7, further comprising an address register for the instruction pre-prefetch.

10. The apparatus according to claim 9, wherein a flag indicating whether or not a value of said address register is valid is held.

11. The apparatus according to claim 9, wherein when an instruction sequence to be actually executed has to be executed again, said address register is nullified.

12. The apparatus according to claim 7, wherein when an instruction is pre-prefetched from the prefetched instruction sequence, a branch prediction mechanism is used.

13. An instruction control method used with a device including a cache memory, a lower memory, an instruction fetch device issuing an instruction fetch request for a target of a first branch instruction to the cache memory, and an instruction control device processing a instruction sequence stored in the cache memory, comprising:

pre-prefetching a target instruction sequence for a target of a second branch instruction, following the first branch instruction, by preliminarily transferring a predetermined instruction sequence based on a past history, from the lower memory to the cache memory when the target instruction sequence for the target of the first branch instruction is not in the cache memory.

14. The method according to claim 13, further comprising:

predicting a branch target instruction of a branch instruction; and storing a fetched instruction sequence, wherein in said pre-prefetching a target instruction sequence, when an instruction sequence cannot be stored in said storing a fetched instruction sequence although a branch is predicted in said predicting a branch target instruction, and when there is not a branch prediction target instruction sequence to said cache memory unit, said predicted instruction sequence is preliminarily transferred from the lower memory unit to the cache memory unit.

15. The method according to claim 13, wherein an instruction pre-prefetch request is issued when a normal instruction fetch request cannot be issued due to an interlock factor.

16. The method according to claim 13, further comprising setting a priority depending on a type of instruction fetch including the pre-prefetch, and issuing an instruction fetch request or an instruction pre-prefetch request for said cache memory unit based on the priority.

17. The method according to claim 13, further comprising when actual instruction fetch is performed using the same address, having the instruction fetch inherit the instruction pre-prefetch, or bypassing to said instruction control device an instruction sequence being transferred to said cache memory unit when an operation of transferring an instruction to said cache memory unit by the insolation prefetch cannot to be performed in time.

18. The method according to claim 13, wherein said instruction pre-prefetch is not continuously performed for the same address or the same cache block.

19. The method according to claim 13, wherein in said pre-prefetching an instruction, an instruction in the prefetched instruction sequence is prefetched.

* * * * *

UNITED STATES PATENT AND TRADEMARK OFFICE
CERTIFICATE OF CORRECTION

PATENT NO.   : 6,912,650 B2
DATED        : June 28, 2005
INVENTOR(S)  : Masaki Ukai et al.

It is certified that error appears in the above-identified patent and that said Letters Patent is hereby corrected as shown below:

Column 27,
Line 14, after "instruction" insert -- is --.

Column 28,
Lines 28 and 52, delete "insolation" and insert -- instruction --.

Signed and Sealed this

Twenty-first Day of February, 2006

JON W. DUDAS
*Director of the United States Patent and Trademark Office*